(12) United States Patent
Jefferies et al.

(10) Patent No.: US 12,507,623 B2
(45) Date of Patent: Dec. 30, 2025

(54) OUTER ROTOR BRUSHLESS MOTOR AND PLANETARY GEAR ASSEMBLY FOR POWER TOOL

(71) Applicant: Black & Decker Inc., New Britain, CT (US)

(72) Inventors: Dustin Jefferies, Baltimore, MD (US); Bhanuprasad V. Gorti, Perry Hall, MD (US); John B. Fogle, White Hall, MD (US); John D. Cox, Lutherville, MD (US)

(73) Assignee: BLACK & DECKER INC., New Britain, CT (US)

( * ) Notice: Subject to any disclaimer, the term of this patent is extended or adjusted under 35 U.S.C. 154(b) by 793 days.

(21) Appl. No.: 17/734,323

(22) Filed: May 2, 2022

(65) Prior Publication Data

US 2022/0354052 A1    Nov. 10, 2022

Related U.S. Application Data

(60) Provisional application No. 63/184,476, filed on May 5, 2021.

(51) Int. Cl.
```
A01D 34/78      (2006.01)
A01D 34/68      (2006.01)
A01D 101/00     (2006.01)
```
(52) U.S. Cl.
CPC ...... *A01D 34/78* (2013.01); *A01D 2034/6837* (2013.01); *A01D 2101/00* (2013.01)

(58) Field of Classification Search
CPC ...... H02K 1/2786; H02K 7/102; H02K 7/116; H02K 7/145
See application file for complete search history.

(56) References Cited

U.S. PATENT DOCUMENTS 9,812,931 B2 * 11/2017 Lankin ................. H02K 7/1021
9,878,435 B2 *  1/2018 Ito ........................... B25F 5/008
(Continued)

FOREIGN PATENT DOCUMENTS

DE    102020121861 A1 *  3/2021 ............ B25B 19/00
JP       2013144340 A *  7/2013 ........... B24B 23/028
(Continued)

OTHER PUBLICATIONS

English translation of WO2017159201A1, accessed Apr. 8, 25 via Espacenet, <https://translationportal.epo.org/emtp/translate/?ACTION=description-retrieval&COUNTRY=WO&ENGINE=google&FORMAT=docdb&KIND=A1&LOCALE=en_EP&NUMBER=2017159201&SRCLANG=ja&TRGLANG=en> (Year: 2017).*

(Continued)

*Primary Examiner* — Jeremy A Luks
(74) *Attorney, Agent, or Firm* — Amir R. Rohani

(57) ABSTRACT

A power tool is provided including a housing, a brushless direct-current (BLDC) motor, and a gear assembly. The motor includes a stator having an inner stator, a rotor shaft extending along a center axis and including a first bearing and a second bearing; an outer rotor, a first end cap, and a second end cap. The first end cap includes a radial back plate having a center opening in the radial back plate through which the rotor shaft extends and pins projecting around the rotor shaft and parallel to the rotor shaft. The gear assembly is mounted on the first end cap and includes planetary gears supported by the pins in engagement with the rotor shaft.

16 Claims, 29 Drawing Sheets

(56) References Cited

U.S. PATENT DOCUMENTS

| | | | |
|---|---|---|---|
| 9,925,653 B2 * | 3/2018 | Staas | ............... B25D 16/00 |
| 2002/0140302 A1 | 10/2002 | Hsu | |
| 2015/0014007 A1 | 1/2015 | Ukai | |
| 2019/0058373 A1 * | 2/2019 | Fogle | ............... H02K 7/02 |
| 2020/0343789 A1 | 10/2020 | Fogle | |

FOREIGN PATENT DOCUMENTS

| | | | | |
|---|---|---|---|---|
| JP | 2016111738 A | * | 6/2016 | |
| WO | 20120137427 A1 | | 10/2012 | |
| WO | WO-2017159201 A1 | * | 9/2017 | ............ B23Q 11/12 |

OTHER PUBLICATIONS

EP EESR dated, Oct. 10, 2022 in corresponding EP application No. 22171516.2.

* cited by examiner

OUTER ROTOR BRUSHLESS MOTOR AND PLANETARY GEAR ASSEMBLY FOR POWER TOOL

RELATED APPLICATION

This patent application claims the benefit of U.S. Provisional Patent Application 63/184,476 filed May 5, 2021, which is incorporated herein by reference in its entirety.

FIELD

This disclosure relates to an outer-rotor brushless motor, and more particularly to a high-power outer-rotor brushless motor and gear system for use in power tools and outdoor products.

BACKGROUND

Conventional brushless direct-current (BLDC) motors are provided with a permanent magnet rotor supported within a stator. The stator includes a ring-shaped stator core, a series of stator teeth that extend radially inwardly from the stator core, and a series of stator windings wound in various patterns on the stator teeth. The rotor includes a rotor core that supports a number of magnets and is mounted on a rotor shaft. The shaft is supported relative to the stator via one or more bearings.

Another type of BLDC motor, referred to as an outer-rotor or external rotor motor, is provided with the rotor on the outside of the stator. In an outer-rotor motor, the rotor magnets are provided on an outer cup that is rotatable around a stator core. The outer cup includes a plate on one side of the stator that is secured to a rotor shaft. US Patent Publication No. 2019/0058373, which is incorporated herein by reference in its entirety, provides an example of an outer-rotor motor in a nailer, where the outer rotor includes an integrated flywheel for driving a driver of the nailer. Outer-rotor motors provides some performance advantages over comparable inner-rotor motors. Namely, since an outer rotor is by necessity larger than an inner rotor, it creates higher inertia and reduces the torque ripple effect and lower vibration. An outer rotor also provides higher magnetic flux and is also capable of producing more torque than a comparable inner rotor motor.

Use of electric motors in battery-operated cordless outdoor products such as lawn mowers has gained popularity in recent years. Electric motors, particularly brushless motors as described above, are capable of producing high amount of output power at a high degree of efficiency suitable for such applications. Despite its advantages, use of electric brushless motor in such products presents challenges relating to placement and assembly of the motor in a compact and efficient manner. Moreover, as outdoor products are used in environments with high amount of debris, dust, and grass particulate, protection of the motor against entry of debris and contamination is of great importance.

An impact tool such as a demolition tool or a hammer typically includes a tool holder in which a cutting tool can be supported and driven by an impact mechanism. The impact tool typically includes an electric motor that converts electrical energy to a rotary motion and an impact mechanism by which the rotary output of the electric motor is converter to a linear motion. The impact mechanism repetitively strikes the end of a cutting tool to impart axial impacts onto the cutting tool. The U.S. Pat. No. 10,328,558, which is incorporated herein by reference in its entirety, describes an example of such a hammer drill that can operate in a hammer mode to perform this operation. In an impact tool, the motor is typically housed within a motor housing below the transmission mechanism in a direction perpendicular to the longitudinal axis of the transmission mechanism. A handle is typically attached at one end to the end of the motor housing and at the other end to the transmission housing. A battery receptacle may be located below the handle adjacent the motor housing.

While outer-rotor brushless electric motors are capable of producing high amount of output power at a high degree of efficiency suitable for impact power tools, placement of the motor in a compact and efficient manner and without significantly increasing the overall length and/or diameter of the tool housing presents challenges. Further, many such tool operate at relatively low speed, and disposition of a speed-reduction gear mechanism in a compact and efficient manner adds to the complexity and challenges.

SUMMARY

According to an aspect of this disclosure, a power tool is provided comprising: a housing; a brushless direct-current (BLDC) motor mounted within or on the housing, the motor comprising: a stator having a stator core, a plurality of teeth extending radially outwardly from the stator core, and a plurality of windings wound around the stator teeth; a rotor shaft extending along a center axis; a rotor having a rotor core disposed around the stator, a plurality of permanent magnets secured to the rotor core, an inner annular member mounted on the rotor shaft; a first end cap mounted on the housing, the first end cap including a radial back plate having a center opening in the radial back plate through which the rotor shaft extends; and a second end cap including a main body disposed adjacent the stator; and a gear assembly mounted on the first end cap, wherein the first end cap includes a plurality of pins projecting parallel to the rotor shaft, and the gear assembly includes a plurality of planetary gears disposed on the plurality of pins to engage the rotor shaft.

In an embodiment, the power tool further includes a flywheel including a ring gear that engages the plurality of planetary gears.

In an embodiment, a diameter of the flywheel is approximately equal to a diameter of the first end cap. In an embodiment, a diameter of the ring gear is approximately equal to a diameter of the first end cap.

In an embodiment, the gear assembly further includes a drive shaft coaxially projecting from the flywheel to rotate with the flywheel. In an embodiment, a transmission bearing is mounted on the drive shaft to support the flywheel relative to the housing.

In an embodiment, the first end cap is integrally formed with the housing.

In an embodiment, the power tool further comprises: a tubular cylinder housed within the housing defining a longitudinal axis; a piston reciprocatingly disposed within the tubular cylinder; a crank mechanism disposed within the housing configured to convert a rotary motion to a reciprocating motion for driving the piston; a tool holder mounted on the housing forward of the tubular cylinder; and a battery receptacle provided on the housing for receiving a removable power tool battery pack, the battery pack being provided on a first side of a plane that intersects the longitudinal axis when received within the battery receptacle. In an embodiment, the motor is mounted on the housing on a second side of the plane that intersects the longitudinal axis such that a distance between the longitudinal axis and a center of gravity of the power tool with the battery pack received within the battery receptacle is less than or equal to approximately 20% of a full height of the power tool.

In an embodiment, a power tool is provided comprising: a housing; a tubular cylinder housed within the housing defining a longitudinal axis; a piston reciprocatingly disposed within the tubular cylinder; a crank mechanism disposed within the housing configured to convert a rotary motion to a reciprocating motion for driving the piston; a handle having two ends mounted to the housing; a battery receptacle disposed adjacent a first end of the handle; a brushless direct-current (BLDC) motor mounted within or on the housing, the motor comprising: a stator having a stator core, a plurality of teeth extending radially outwardly from the stator core, and a plurality of windings wound around the stator teeth; a rotor shaft extending along a center axis; a rotor having a rotor core disposed around the stator, a plurality of permanent magnets secured to the rotor core, an inner annular member mounted on the rotor shaft; a first end cap mounted on the housing, the first end cap including a radial back plate having a center opening in the radial back plate through which the rotor shaft extends; and a second end cap including a main body disposed adjacent the stator; and a gear assembly disposed between the first end cap of the motor and the crank mechanism and engaging the rotor shaft to reduce an output speed of the motor, wherein the motor and the gear mechanism are mounted on the housing outside a cylindrical envelope defined by the tubular cylinder, and the motor is disposed adjacent a second end of the handle.

In an embodiment, a longitudinal axis of the second end of the handle intersects the first end cap.

In an embodiment, a flywheel is rotated by the rotor shaft and is coupled to a drive shaft that engages the crank mechanism.

In an embodiment, the flywheel intersects a longitudinal axis of an upper wall of the tubular cylinder.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The drawings described herein are for illustration purposes only and are not intended to limit the scope of this disclosure in any way.

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
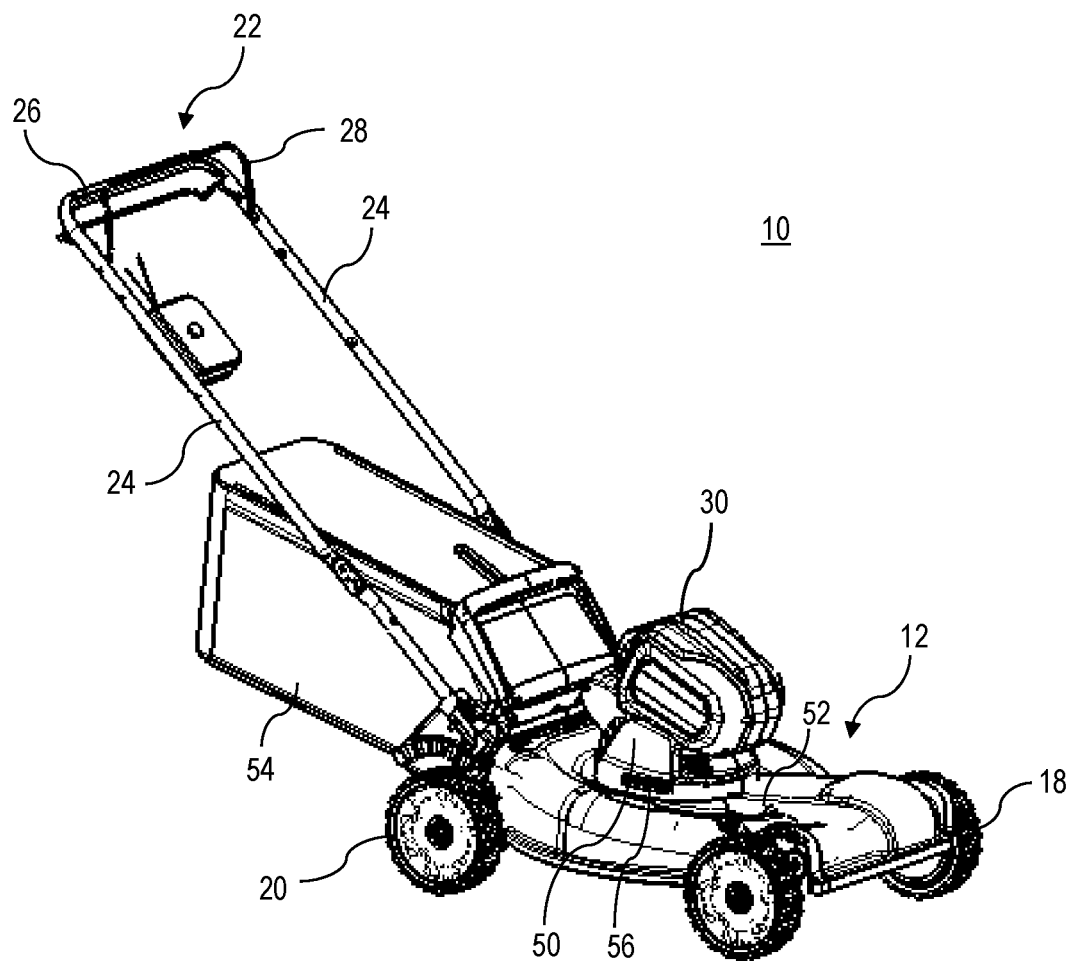
FIG. 1 depicts a perspective view of an electric mower, according to an embodiment.
Figure 2:
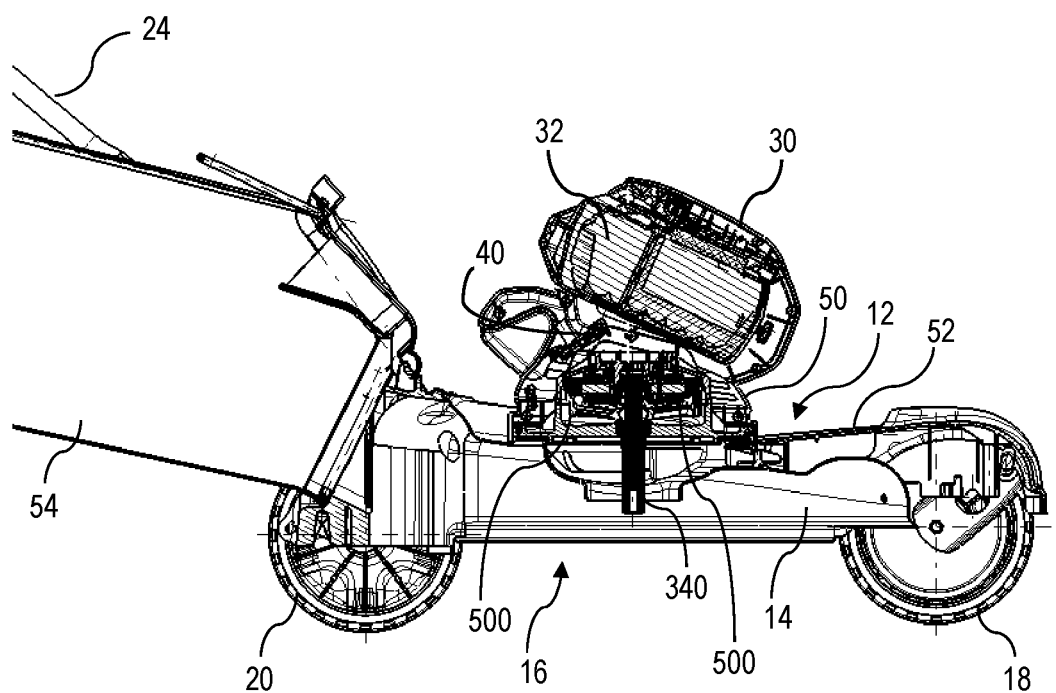
FIG. 2 depicts a side view of an electric mower with a translucent main body, according to an embodiment.

FIG. 1 depicts a perspective view of an electric mower 10, according to an embodiment. FIG. 2 depicts a side view of an electric mower 10 with a translucent main body 12, according to an embodiment. As shown in FIGS. 1 and 2, the electric mower 10 includes a main body 12 having a main deck 52 and a motor housing 50. The electric mower 10 further includes one or more blades 14 rotatably supported in a cavity 16 defined below the main deck 52, a pair of front wheels 18 supported by the main body 12, a pair of rear wheels 20 supported by the main body 12, and a handle 22 extending rearwardly from the main body 12. A grass collection bag 54 is supported on a rear side of the main body 12 below the handle 22.

In an embodiment, an outer-rotor brushless DC (BLDC) motor 500 coupled to a rotor shaft 340 is mounted in the motor housing 50 of the main body 12 above the main deck 52 for rotatably driving the one or more blades 14. The motor 500 may be arranged to drive the blades 14 by a direct drive mechanism (i.e., connecting the blade 14 directly to the rotor shaft 340). Alternatively, motor 400 may drive the blades 14 via a transmission mechanism including transfer gears, a transfer belt, and/or other speed and/or torque reduction and transmission components.

The handle 22 is provided with a pair of side rods 24 extending from either side end of the rear part of the main body 12 on two sides of the grass collection bag 54, and a cross rod 26 extending between the rear ends of the side rods 24. The cross rod 26 of the handle 22 is provided with a lever 28 for operating the BLDC motor 500.

In an embodiment, a battery cage 30 is disposed above the motor housing 50 for receiving a removable tool battery pack 32 therein. In an embodiment, the battery pack 32 may be a sliding power tool type battery pack having a 60V, 80V, 100V, or 120V maximum voltage. U.S. Pat. No. 8,573,324, which is hereby incorporated by reference in its entirety, provides an example of a sliding power tool battery pack that slidingly couples to a power tool. The battery cage 30 includes an angular opening sized to receive the battery pack 32 therein at an angle of, for example, 15 to 45 degrees relative to a plane of the main deck 52. In an embodiment, the battery pack 32 is positioned so as to intersect an axis of the rotor shaft 340.

In an embodiment, a power module 40 is disposed in the main body 12 within or adjacent the motor housing 50. The power module 40 includes a series of power switches configured as a three-phase inverter circuit for regulating supply of power from the battery pack to the motor 500. In an embodiment, a controller (not shown) is also disposed within the main body, as a part of the power module 40 or separately thereof, for controlling the switching operation of the power switches. Controller controls the power switches based on the position of the lever 28 to control the average voltage supplied from the battery pack to the motor 500.

In an embodiment, the motor 500 is supported within the motor housing 50 in a way that all components of the motor 500 are positioned above the plane of the main deck 52. Additionally, motor housing 50 is provided with two oppositely arranged exhaust vents 56 disposed above the main deck 52 arranged to expel air away from the motor 500 in a direction radial to the motor shaft 340 above the main deck 52.

The motor 500 features are described here in detail.

Figure 3A:
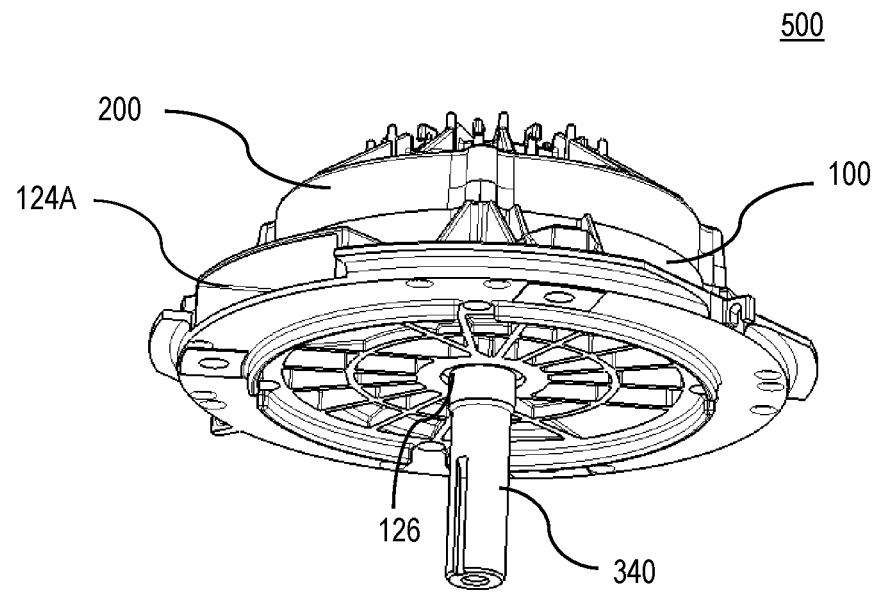
FIGS. 3A and 3B depict front and rear perspective views of an outer-rotor brushless motor, according to an embodiment.
Figure 3B:
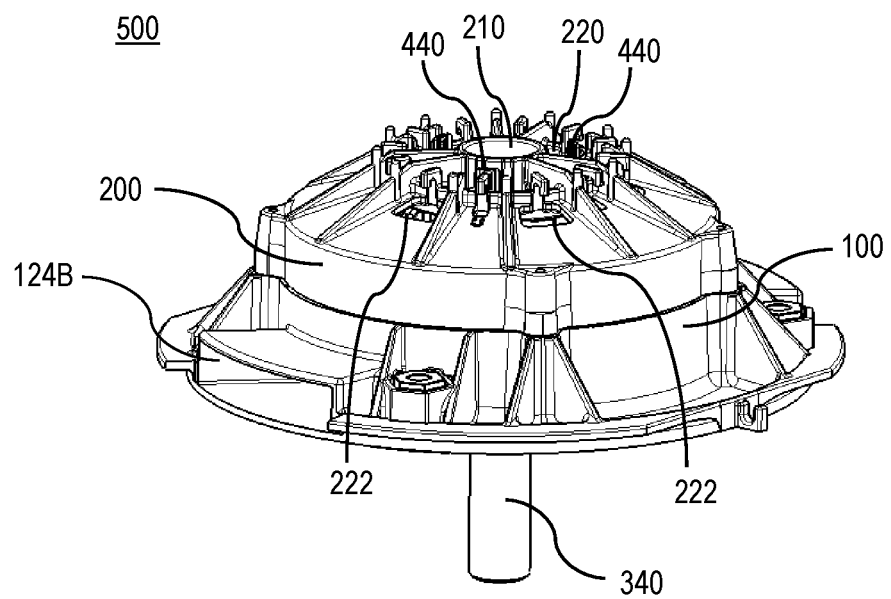

FIGS. 3A and 3B depict front and back perspective views of the BLDC motor 500, according to an embodiment. In an embodiment, motor 500 includes a first end cap 100, also referred to herein as a deck plate or a motor plate, and a second end cap 200, also referred to herein as a motor cup or stator mount. In an embodiment, the first end cap 100 is secured to the main deck 52 of the main body 12 by any method known to one skilled in the art. Similarly, the first end cap 100 and the second end cap 200 are coupled to one another by any method known to one skilled in the art. Such known methods include, but are not limited to, fasteners, adhesive, a tongue and groove assembly, friction-fitting, press-fitting, etc.

In an embodiment, the first end cap 100 includes a center opening 126 through which the rotor shaft 340 extends outwardly and one or more radial exhaust ports 124A and 124B arranged circumferentially on opposite sides of the first end cap 100. The second end cap 200 similarly includes a center opening 210 through which one or more control signal cables (not shown) are received, and a series of openings 220 and 222 disposed at a distance around the center opening 210. In an embodiment, stator terminals 440 to the power module 40 pass through one or more of the openings 220. These features will be described later in detail.

In an embodiment, inlet openings 222 are air inlets align with one or more air inlets (not shown) of the motor housing 50 that receive incoming cooling air from the outside environment. In an embodiment, radial exhaust ports 124A and 124B align with exhaust vents 56 of the motor housing 50 to allow expulsion of hot air away from the motor 500 above the main deck 52 and in a radial direction parallel to the plane of the main deck 52. This arrangement substantially isolates airflow for cooling the motor 500 components from the cavity 16 below the main deck 52. This reduces ingress of contaminated air including dust and grass into the motor 500. This also ensures that the airflow generates by the blade 14 within the cavity 16 is unimpeded by the airflow for cooling the motor 400.

Figure 4A:
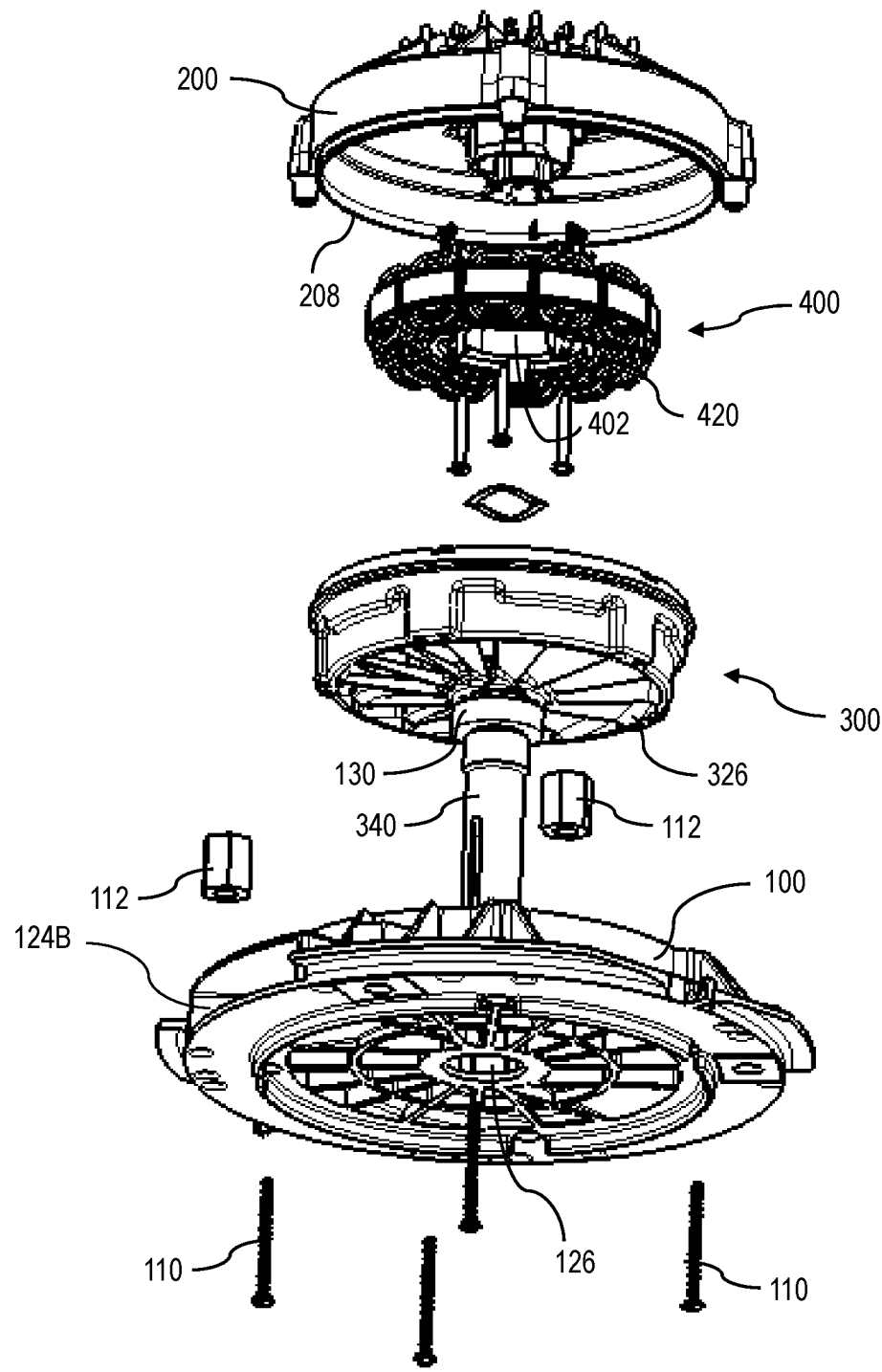
FIGS. 4A and 4B depict front and rear exploded views showing the inner components of the outer-rotor brushless motor, including rotor and stator assemblies and first and second end caps, according to an embodiment.
Figure 4B:
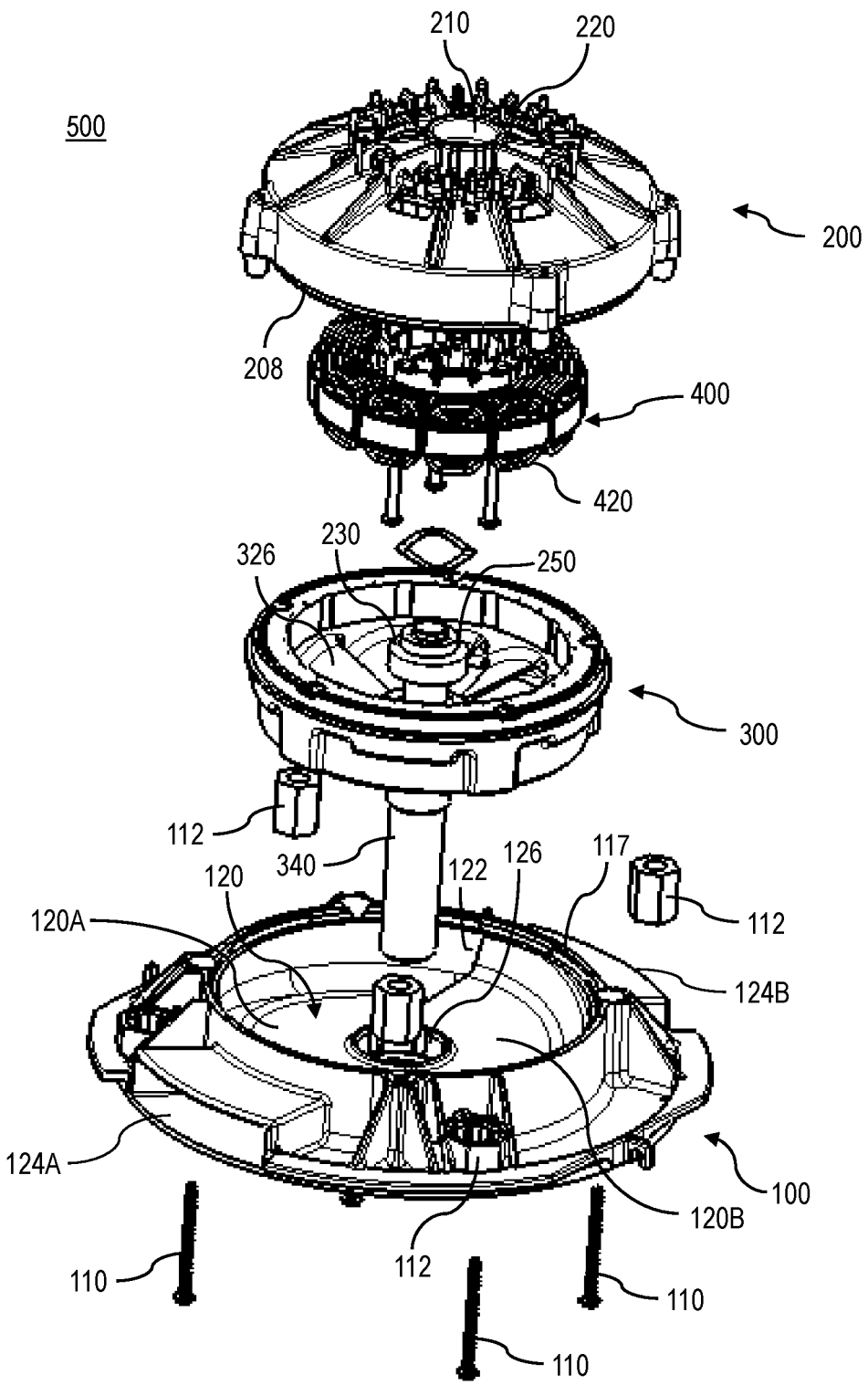
Figure 5:
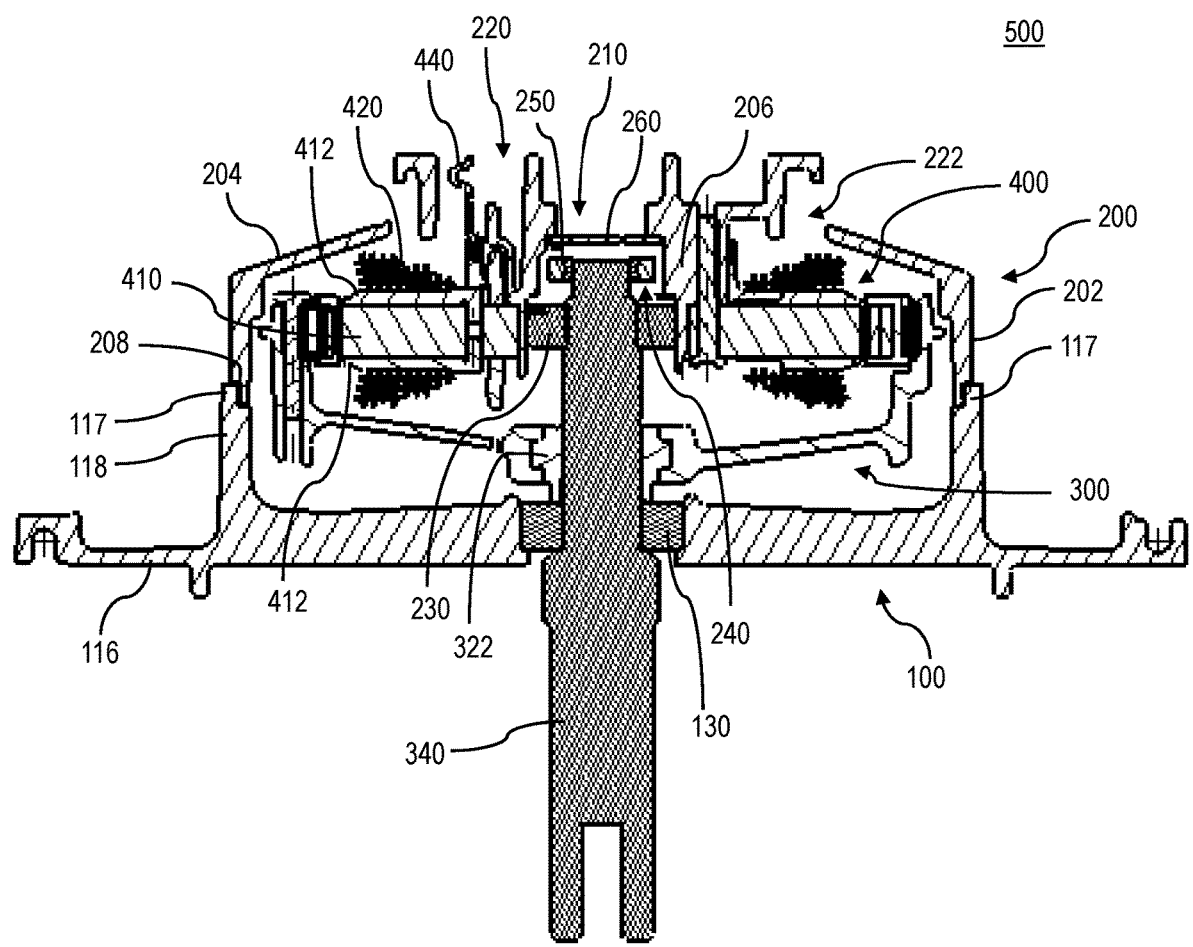
FIG. 5 depicts a side cross-sectional view of the outer-rotor brushless motor, according to an embodiment.

FIGS. 4A and 4B depict front and back exploded views showing the components of BLDC motor 500, according to an embodiment. FIG. 5 depicts a cross-sectional view of the outer-rotor brushless motor 500, according to an embodiment. As shown in these figures, in addition to the first end cap 100 and the second end cap 200, the BLDC motor 500 includes a rotor assembly 300, a stator assembly 400, and the rotor shaft 340. In an embodiment, the first and second end caps 100 and 200 are secured to one another via fasteners 110 or other means to substantially contain and encapsulate the rotor assembly 300 and stator assembly 400 components. These features are described herein in detail.

In an embodiment, stator assembly 400 is provided as an inner stator including a stator lamination stack 410 having a ring-shaped stator core 402 and a plurality of stator teeth radially projecting outwardly from the stator core with slots formed therebetween. Stator windings 420 are wound around the stator teeth defining the phases of the BLDC motor 500. In an embodiment, where the BLDC motor 500 is a three-phase motor includes 12 stator windings 420, the stator will constitute three groups of four stator windings 420 connected together on or around the stator core. The stator windings 420 within each group of stator windings 420 may be electrically coupled together in a series of a parallel connection, and the three groups of windings may be electrically wired together in a wye or a delta configuration. In an embodiment, stator assembly 400 can further include one or more end insulators covering end surfaces of the stator lamination stack 410 to electrically insulate the stator windings 420 from the stator lamination stack 410.

In an embodiment, stator lamination stack 410 has a thickness of approximately 8-14 mm, preferably approximately 10-12 mm, and a diameter of approximately 100-130 mm, preferably approximately 110-115 mm. Thus, in an embodiment, the stator lamination stack has a diameter to thickness ratio of approximately 8-12, preferably approximately 9-11, in an example approximately 10. In an embodiment, this ratio optimizes the motor for high power/high torque applications such as a lawn mower. In an exemplary embodiment, the motor 500 has a maximum output speed of approximately 3,000 rpm, but a maximum power output of at least 1,100 watts, more preferably at least 1,200 watts, in an example approximately 1300 watts, suitable for high power/high torque applications.

In an embodiment, stator assembly 400 is secured, axially and radially, to the second end cap 200. The second end cap 200 is thus also referred to in this disclose as a stator mount. In an embodiment, ring-shaped stator core 402 of the stator assembly 400 is mounted and secured to an inner annular portion of the second end cap 200, as discussed later in detail.

In an embodiment, rotor assembly 300 is provided as an outer rotor including an inner annular member 322 and an outer annular core 320. Inner annular member 322 includes an inner through-hole that is securely mounted over the rotor shaft 340 by press-fitting or other known means. Outer annular core 320 is provided with a larger diameter than the stator assembly 400 so as to circumferentially surround the stator assembly 400 with a small airgap therebetween. Outer annular core 320 supports one or more permeant magnets (discussed below) that magnetically interact with the stator windings 420, causing rotation of the rotor assembly 300 around the stator assembly 400 when the stator windings are sequentially energized. Extending substantially radially or angularly between the inner annular member 322 and the outer annular core 320 are a series of radial blades 326 that form a fan arranged to generate airflow for cooling the motor 500 components, particularly the stator windings 440, as the rotor assembly 300 rotates. In particular, radial blades 326 are contained on their outer periphery by the annular core 320, thus forming an axial fan that directs air parallel to the axis of the rotor shaft 340. As will be described later in detail, first end cap 100 is provided with features to redirect the air generated by the axial fan in a radial direction.

In an embodiment, rotation of the rotor assembly 300 causes rotation of the rotor shaft 340 around its center longitudinal axis. In an embodiment, rotor shaft 340 is axially secured to the first and second end caps 100 and 200 via front and rear bearings 130 and 230, respectively. Front and rear bearing 130 and 230 provide axial and radial support for the rotor shaft 340, and subsequently for the entire rotor assembly 300, with respect to the first and second end caps 100 and 200, and subsequently with respect to the stator assembly 400. This arrangement ensures that the rotor outer annular core 320 is securely positioned around the stator assembly 400 with an airgap in between.

Referring now to FIGS. 6A-6E, and with continued reference to FIGS. 4A-5, details of the outer rotor assembly 300 and its assembly process are described herein, according to an embodiment.

Figure 6A:
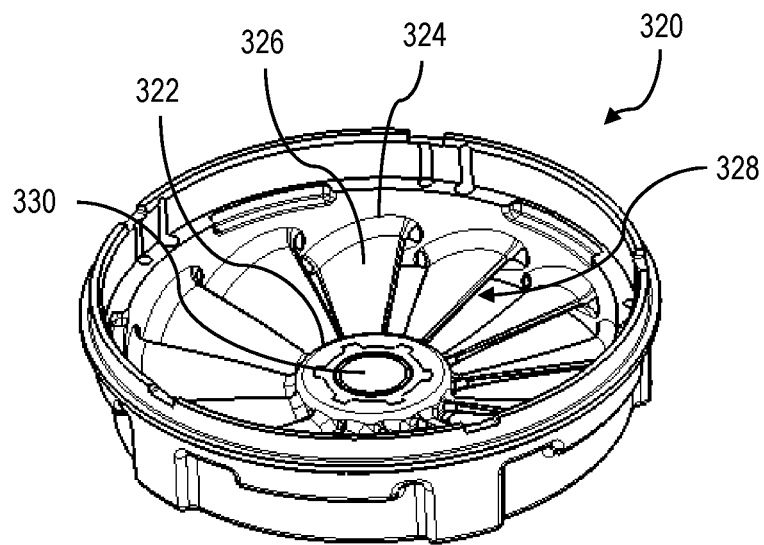
FIGS. 6A-6F depict perspective views of the outer rotor assembly components through the course of the manufacturing assembly, according to an embodiment.

FIG. 6A depicts a partial perspective view of the rotor assembly 300 including inner annular member 322, outer annular core 320, and radial blades 326. In an embodiment, between approximately four to sixteen radial blades 32, more preferably between six to fourteen radial blades, and even more preferably between eight to twelve radial blades, are provided. Each radial blade 326 can extend from an exterior portion of the inner annular member 322 to an interior portion 324 of the outer annular core 320. Interior portion 324 of the outer annular core 320 may include an inwardly-projecting rim having curved portions that mate with radial ends of the radial blades 326. The radial blades 326 can be placed at angles relative to a plane defined by the outer annular core 320 and the inner annular member 322. The angular arrangement of the radial blades 326 forms openings 328 between adjacent radial blades 326, through which airflow is generated and passed towards the first end cap 100. The geometry of the radial blades 326 can be in an airfoil shape to improve an overall efficiency of the moving air.

Figure 6B:
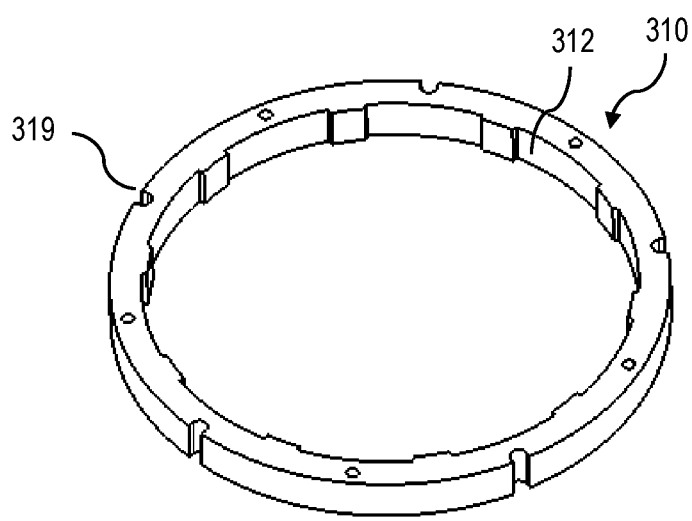
Figure 6C:
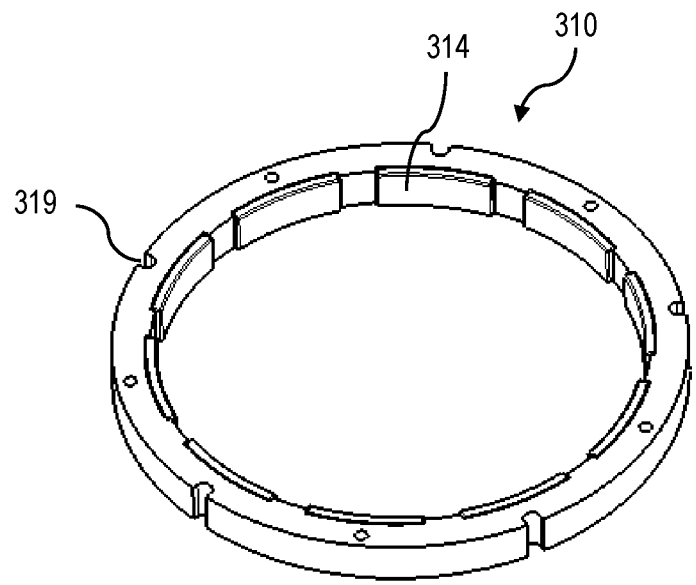

FIG. 6B depicts a perspective view of a laminated back iron ring 310, according to an embodiment. FIG. 6C depicts a perspective view of the laminated back iron ring 310, with permanent magnets 314 mounted on an inner surface thereof. In an embodiment, laminated back iron ring 310 is a ring-shaped lamination stack made of steel or other conductive material mounted within the outer annular core 320 of the rotor assembly 300 to support permanent magnets 314. The laminated back iron ring 310 can include magnet pockets 312 for holding the permanent magnets 314. In an embodiment, the number of the magnet pockets 312 can correspond to the number of the permanent magnets 314. In an embodiment, there may be between four to sixteen permanent magnets 314, more preferably between six to twelve permanent magnets 314, and even more preferably between eight to ten permanent magnets 314. The number of permanent magnets 314 is determined as number of poles and slots of the motor 500.

In an embodiment, each magnet pocket 312 can be formed into a peripherally elongated rectangular shape. In an example, each magnet pocket 312 may also be curved to match the curvature of the laminated back iron ring 310. Each of the permanent magnets 314 inserted into the corresponding magnet pocket 312 can be a sintered neodymium magnet, which is formed into a shape corresponding to the magnet pocket 312. Furthermore, the permanent magnets 314 are magnetized so that the magnets adjacent to each other have poles reverse to each other.

As shown in FIGS. 6A-6C, the inner surface of the outer circular member 324 can include a design to receive the laminated back iron ring 310. To this end, in an embodiment, the inner surface of the outer circular member 324 can include protrusions 332 that can correspond to grooves 319 on the laminated back iron ring 310. The interior portion 324 of the outer annular core 320 provides a platform for mounting and placement of the lamination back iron ring 310.

Figure 6D:
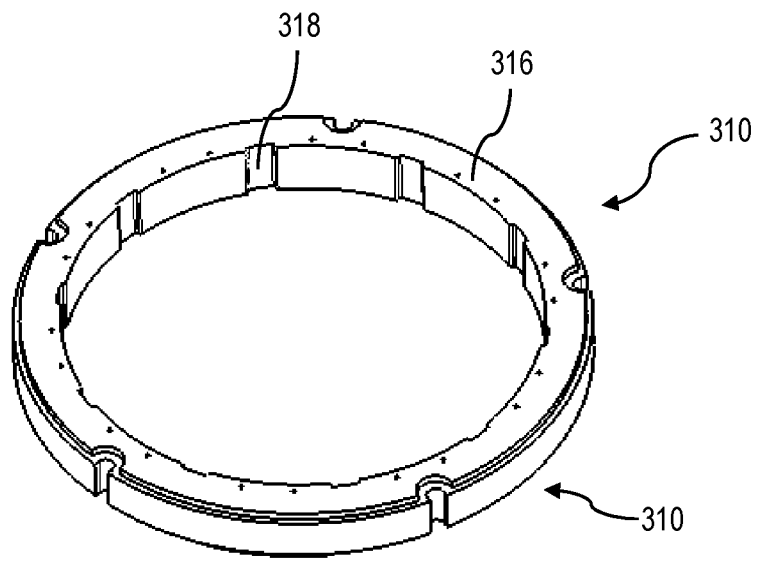

In an embodiment, as shown in FIG. 6D, the laminated back iron ring 310 and the permanent magnets 314 are at least partially encapsulated by an overmold layer 316 including resin or plastic material via an overmold or insert-mold process. In an embodiment, the overmold layer 316 substantially covers the permanent magnets 314 and forms molded-in airflow reliefs 318 between the respective magnets 314.

Figure 6E:
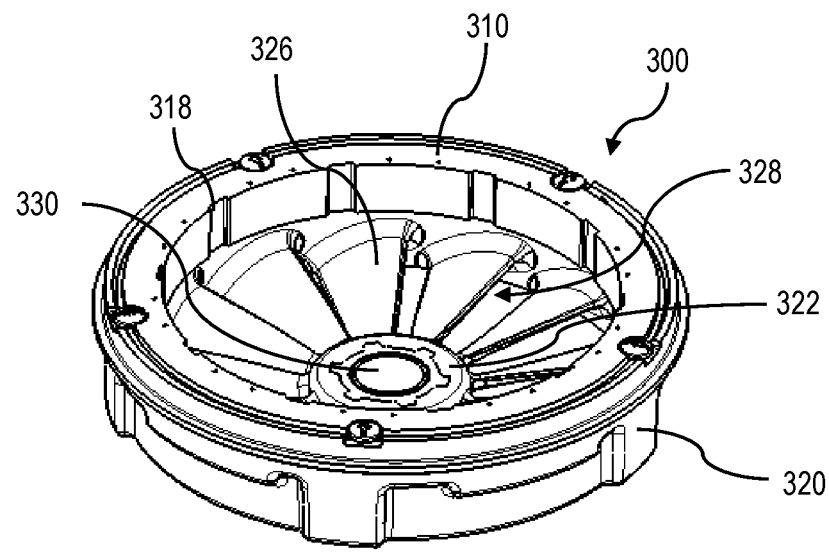

FIG. 6E depicts a perspective view of the outer rotor assembly 300 including the overmolded laminated back iron ring 310 of FIG. 6D, according to an embodiment. In an embodiment, the laminated back iron ring 310 having the permanent magnets 314 and being, at least, partially encapsulated by overmold layer 316 is slip-fitted to the outer annular core 320. In an embodiment, the protrusions 332 of the outer annular core 320 are aligned with the grooves 319 of the laminated back iron ring 310 and the laminated back iron ring 310 is received into the outer annular core 320.

In an embodiment, the laminated back iron ring 310 is secured to the outer annular core 320 by any known methods, such as by an adhesive to form the rotor assembly 300. In an embodiment, the laminated back iron ring 310 is first inserted into the outer annular core 320 and then the permanent magnets 314 are secured into the magnet pockets 312 by any known methods, such as by an adhesive. The overmold layer 316 may then be applied to the laminated back iron ring 310 having the permanent magnets 314 to form the rotor assembly 300.

Figure 6F:
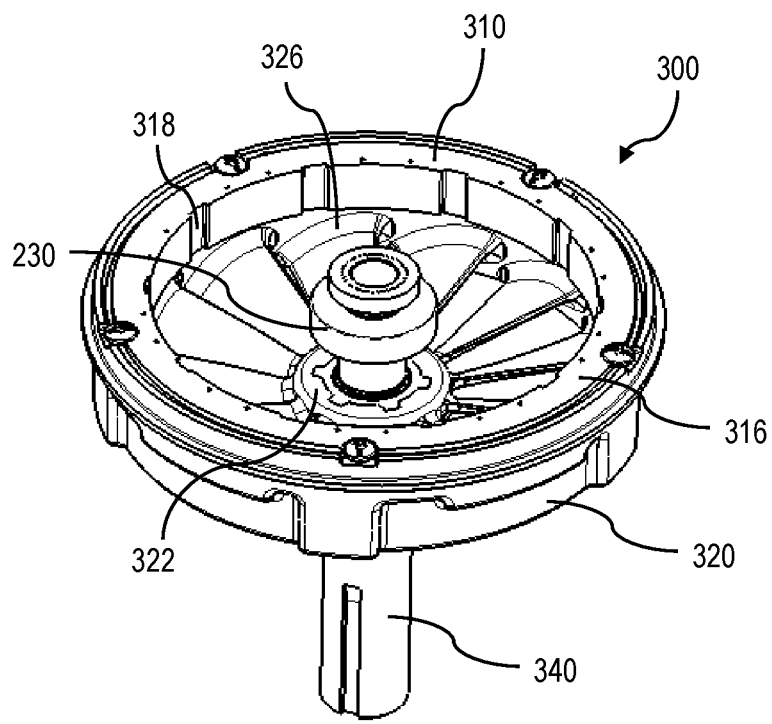

FIG. 6F depicts a perspective view of the rotor assembly 300 mounted on the rotor shaft 340, according to an embodiment. As previously discussed, in an embodiment, inner through-hole 330 formed within the inner annular member 322 of the rotor assembly 300 is press-fitted on the rotor shaft 340. The rotor shaft 340 is thus axially, radially, and rotationally secured to the rotor assembly 300. As also previously discussed, rotor shaft 340 is further secured, axially and radially but not rotationally, to first end cap 100 and the second end cap 200 via front and rear bearings 130 and 230, respectively.

This arrangement provides an outer-rotor assembly having permanent magnets disposed around the outer circumference of a stator assembly, but also coupled to a central rotor shaft rotatably received within the stator assembly. This arrangement also integrates fan blades forming an axial fan for cooling the motor into the outer rotor assembly structure, ridding the motor of a separate fan structure.

In an embodiment, the rotor laminated back iron ring 310 has a diameter of approximately 120-150 mm, preferably approximately 130-140 mm, in an example approximately 136 mm. The entire rotor assembly 300 including the outer annular core 320 has a diameter of approximately 130-160 mm, preferably approximately 140-150 mm, in an example approximately 145 mm. In an embodiment, the rotor laminated back iron ring 310 has approximately the same thickness as the stator lamination stack 410.

Figure 7A:
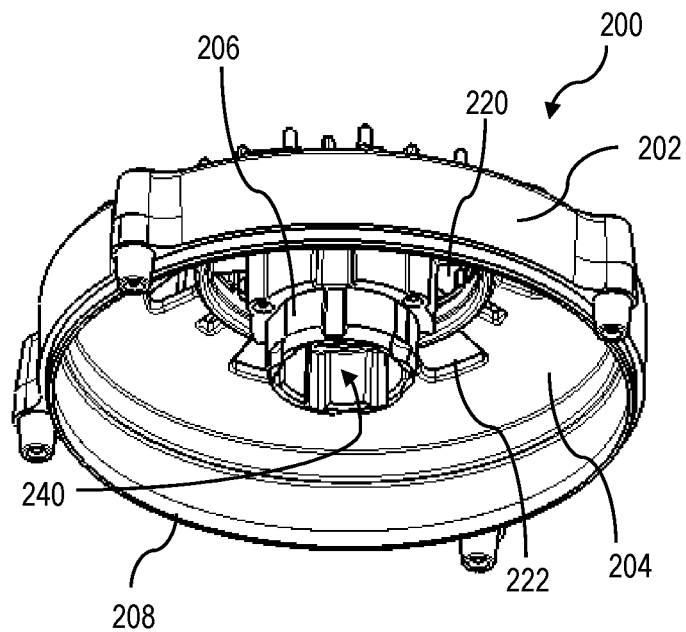
FIGS. 7A and 7B depict front and rear perspective views of the second end cap, according to an embodiment.
Figure 7B:
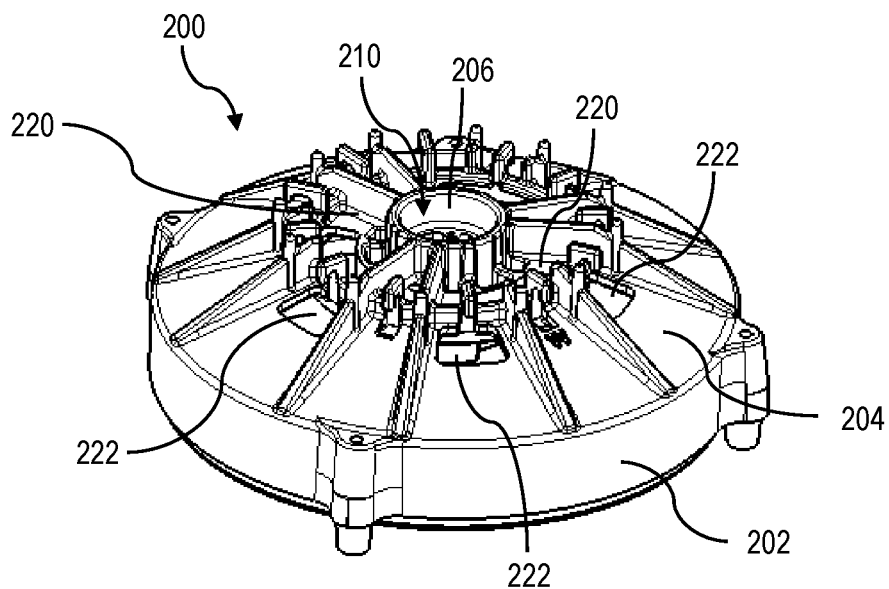
Figure 7C:
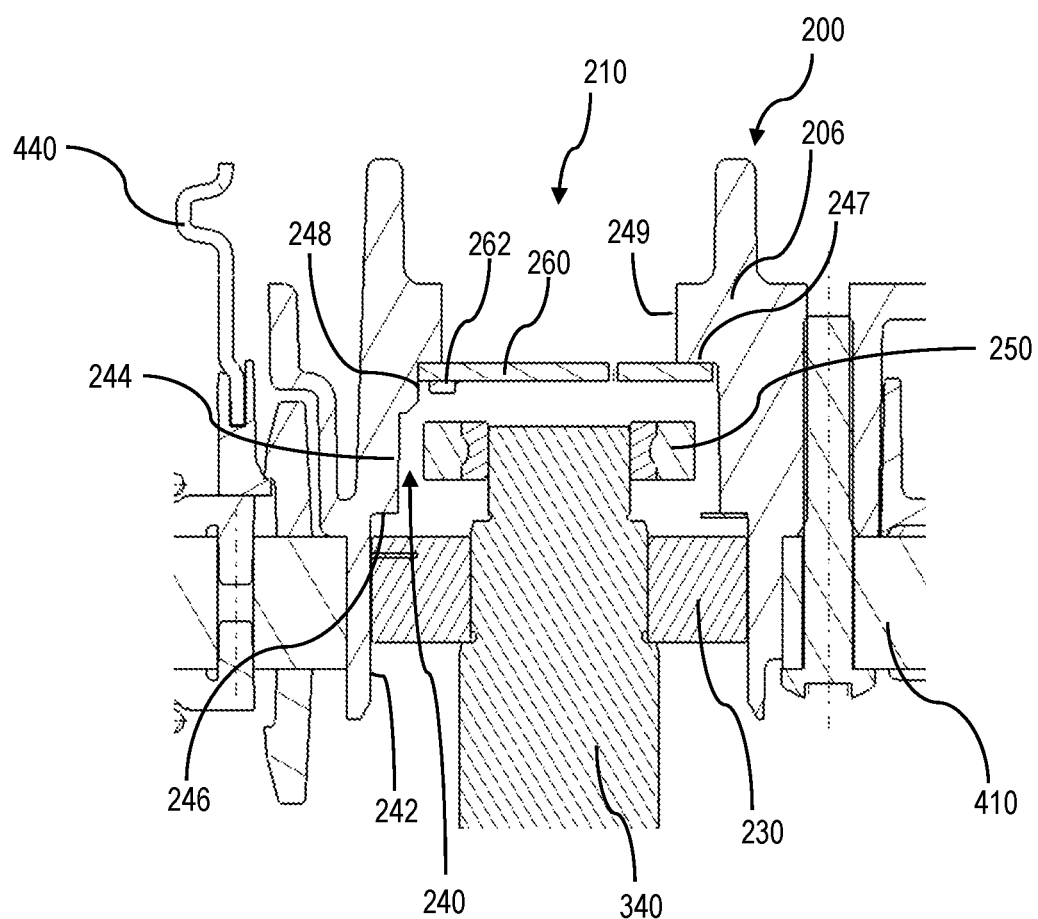
FIG. 7C depicts a partial cross-sectional view of the motor showing a bearing pocket of the second end cap receiving a bearing and a sensor arrangement, according to an embodiment.

Referring now to FIGS. 7A, 7B and 7C, and with continued reference to FIGS. 4A-5, the second end cap 200 is described herein in detail.

FIGS. 7A and 7B depict front and back perspective views of second end cap 200, according to an embodiment. FIG. 7C depicts a zoom-in cross-sectional view of the second end cap 200.

In an embodiment, second end cap 200 includes an outer annular body 202, an inner annular body 206 forming the center opening 210, and a conical or dome shaped main body 204 extending between the inner annular body 206 and the outer annular body 202. In an embodiment, front peripheral edge 208 of the outer annular body 202 is disposed to mate with the first end cap 200, as discussed later.

In an embodiment, center opening 210 of the inner annular body 206 forms a pocket 240 facing the first end cap 200 that securely supports the rear bearing 230 of the rotor shaft 340 therein to axially and radially support the rotor shaft 340 with respect to the second end cap 200. Additionally, pocket 240 houses a sense magnet ring 250 including a series of magnets is mounted on a distal end of the rotor shaft 340 rearwardly of the rear bearing 230. Moreover, pocket 240 houses and supports a positional sensor board 260 including a series of positional sensors (e.g., Hall sensors) in close proximity to and facing the sense magnet ring 250. The positional sensor board 260 is oriented on a plane substantially parallel to the longitudinal axis of the rotor shaft 340.

In an embodiment, pocket 240 includes a bearing pocket 242 at an end of the pocket 240 closest to the second end cap 200. The bearing pocket 242 (i.e., first portion of the inner annular body 206) has a first diameter sized to form-fittingly receive the rear bearing 230 of the rotor shaft 340 therein.

In an embodiment, the pocket 240 further includes a sense magnet pocket 244 disposed rearward of the bearing pocket 242 with respect to the second end cap 200. The sense magnet pocket 244 (i.e., third portion of the inner annular body 206) has a second diameter smaller than the first diameter, sized to freely receive and house the sense magnet ring 250 therein. In an embodiment, radial rim 246 formed between the bearing pocket 242 and the sense magnet pocket 244 forms as an axial stop for the rear bearing 230.

In an embodiment, the pocket 240 further includes a positional sensor board pocket 248 (i.e., second portion of the inner annular body 206) disposed rearward of the sense magnet pocket 244 with a third diameter smaller than the first and second diameters. In an embodiment, positional sensor board pocket 248 is sized to form-fittingly receive the positional sensor board 260 therein, with magnetic (hall) sensors 262 in close proximity to the sense magnet ring 250 at a distance of, for example, 0.5 to 3 mm, preferably 0.2-2 mm, and approximately 1 mm. The magnetic sensors 262 detect a magnetic field generated by the sense magnet ring 250 magnets to detect a rotatory position of the rotor shaft 340. In an embodiment, a radial rim 247 formed between the positional sensor board pocket 248 and an inner wall 249 of center opening 210 forms an axial stop for the positional sensor board 260. In an embodiment, positional sensor board 260 may be fastened to the radial rim 247 or the side walls of the positional sensor board pocket 248 via, for example, screws or other fastening means. Communication signals from the positional sensor board 260 may be passed through the center opening 210 for communication with the controller (not shown).

In an embodiment, the bearing pocket 240 protrudes inwardly towards the stator assembly 400 from the second end cap 200, with at least the bearing pocket 242 protruding axially into the inner opening of the ring-shaped stator core 402 of the stator assembly 400. This arrangement allows the rear bearing 230 to sit within the inner opening of the ring-shaped stator core 402 in-line with the stator lamination stack 410 along the same radial plane. Further, the sense magnet ring 250 is in-line with at least a portion of the stator windings 420 along the same radial plane. The arrangement according to this embodiment reduces the axial length of the BLDC motor 500 and flattens the overall envelope.

In an embodiment, one or more openings 220 are disposed in the main body 204 at a first radius around the center opening 210 through which the stator terminals 440 (i.e., for receiving U, V, W phase power lines from the power module 40) are received. In an embodiment, the stator terminals 440 project slightly out of the openings 220 to ease wrapping or fusing of power lines to the terminals 440. In an embodiment, air inlets 222 are disposed in the main body 204 along a second radius greater than the first radius around the center opening 210 for receiving incoming cooling air into the second end cap 200 for airflow generated by the motor fan.

In an embodiment, as briefly discussed above, the inner annular portion 206 of the second end cap 200 structurally, i.e., radially and axially, supports the stator assembly 400. In an embodiment, the ring-shaped stator core 402 is sized to be mounted around the inner annular portion 206 of the second end cap 200, with the stator lamination stack 410 being disposed circumferentially around the bearing pocket 242. This structure ensures that the stator assembly 400 is securely piloted within the second end cap 200 with high precision.

In power appliances such electric mower 10 utilizing the motor 500 described herein, the rotor assembly 300 can be seen deflecting drastically upon high impact resulting from contact between the mower blades 14 and a hard object such as a rock or metal object, particularly ingress of such hard object within the blades 14. In some instances, rotor assembly 300 can be seen pivoting around an axis that is perpendicular to the general axis of the motor 500 to deflect upwardly in the direction of the second end cap 200. In an embodiment, the deviation of the rotor shaft 340 from the longitudinal axis of the motor 500 causes the rotor assembly 300 to pivot around an axis perpendicular to the axis of the motor 500, one side of the rotor assembly 300 making contact with the stator assembly 400 and the second end cap 200. Any contact between the rotor assembly 300 in its rotating state and the non-rotating parts of the motor 500 including the stator assembly 400 and the second end cap 200 can cause severe damage to the motor 500 components.

Figure 8A:
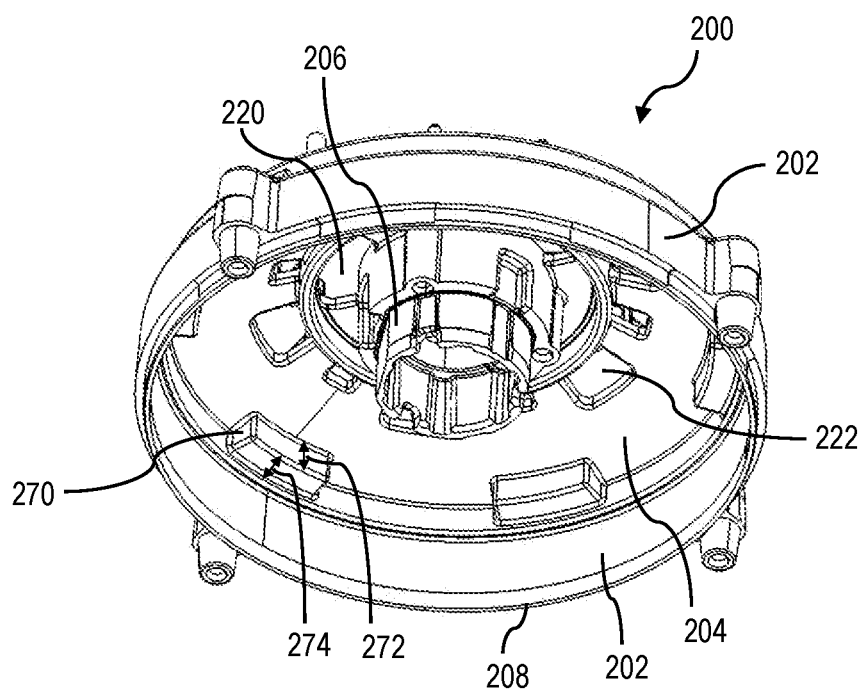
FIG. 8A depicts a perspective view of the second end cap including deflection limiting members, according to an embodiment.

To limit the deflection of the rotor assembly 300 in the event of such contact or ingress of hard objects with or into the mower blades 14, according to an embodiment of the invention, the second end cap 200 is provided with one or more deflection limiting members 270, as shown in the perspective view of FIG. 8A. In an embodiment, deflection limiting members 270 may be made of flexible and/or elastically resilient material such as plastic, rubber, etc. In an embodiment, deflection limiting members 270 may be secured to an inner surface of the main body 204 of the second end cap 200 bordering the outer annular body 202. In an embodiment, deflection limiting members 270 may be provided as a series of discrete segments provided at a distance from one another, as shown in FIG. 8A, or as a one-piece ring sized to be received within the outer annular body 202. In an embodiment, deflection limiting members 270 may be provided as integral ribs projecting from the main body 204 and/or the outer annular body 202 of the second end cap 200, or as separate pieces assembled into the second end cap 200.

In an embodiment, deflection limiting members 270 are provided with a height 272 (in the axis direction of the motor 500) that is smaller than the distance between the rotor assembly 300 and the main body 204 of the second end cap 200. In an embodiment, the height 272 of deflection limiting members 270 is sized so that the rotor assembly 300 does not contact the deflection limiting members 270 during normal operation and with a normal level of vibration and movement, but is prevented by deflection limiting members 270 from pivoting drastically so as to come into contact with the stator assembly 400.

In an embodiment, a thickness 272 (in the radial direction of the motor 500) of the deflection limiting members 270 is sized to come into contact with the rotor assembly 300, i.e., peripheral end of the laminated back iron ring 310 or the overmold layer 316, but not with the stator assembly 400. In an embodiment, deflection limiting members 270 are disposed along a ring having a diameter that is greater than the diameter of the stator assembly 400 but approximately corresponds to the diameter of the laminated back iron ring 310 of the rotor assembly 300.

In the event of high impact resulting from contact or ingress of hard objects described above, the upward deflection of the rotor assembly 300 may also at times make contact with and damage the positional sensor board 260. This is particularly due to the small air gap that is maintained between the positional sensor board 260 and the sense magnet ring 250 for accurate sensing of the angular position of the rotor assembly 300.

Figure 8B:
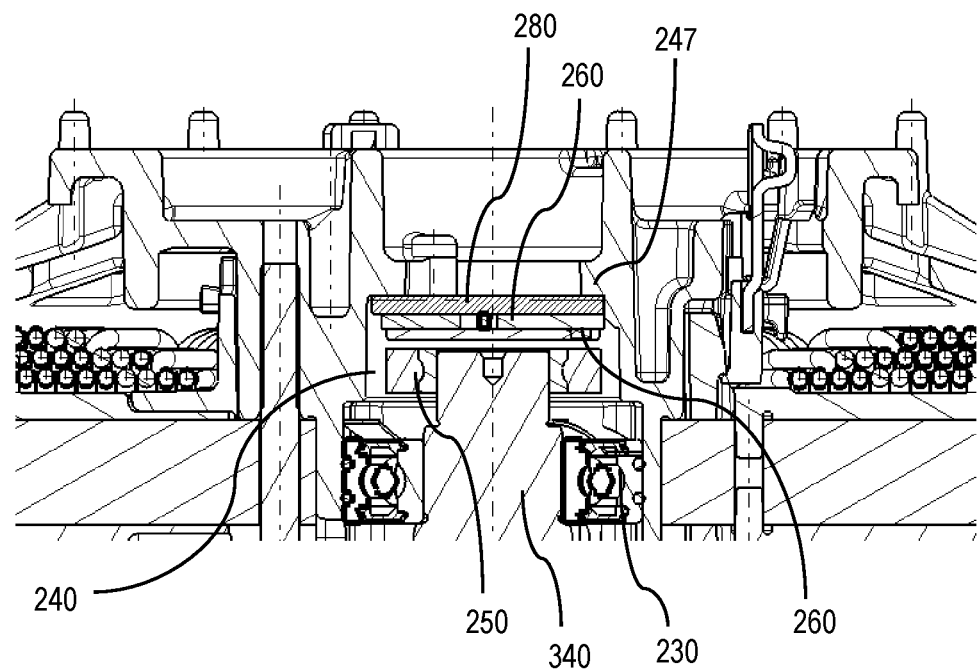
FIG. 8B depicts a partial cross-sectional view of the motor including an impact absorbing member behind the positional sensor board within the bearing pocket, according to an embodiment.

To absorb this impact and protect the positional sensor board 260 from damage, according to embodiment, an impact absorbing member 280 is provided, as depicted in the partial cross-sectional view of FIG. 8B. In an embodiment, impact absorbing member 280 is received within sensor board pocket 248. Impact absorbing member 280 may be fastened to the radial rim 247 or the side walls of the positional sensor board pocket 248 via, for example, adhesive, screws or other fastening mechanism. In an embodiment, positional sensor board 260 is in turn secured to the impact absorbing member 280 via, for example, an adhesive, screws, or other fastening mechanism. In an embodiment, impact absorbing member 280 may be made of flexible or resiliently elastic material such as dense foam, rubber, etc. In an embodiment, impact absorbing member 280 may be provided with the sufficient thickness to effectively absorb the force of an impact upon the positional sensor board 260 by the rotor shaft 340 and/or the sense magnet ring 250, while maintaining proper airgap between the sense magnet ring 250 and the positional sensor board 260. In an embodiment, impact absorbing member 280 may be 1-3 mm in thickness. In an embodiment, impact absorbing member 280 may be disc-shaped or ring-shaped with an outer diameter that is substantially equivalent to or greater than the positional sensor board 260.

Figure 8C:
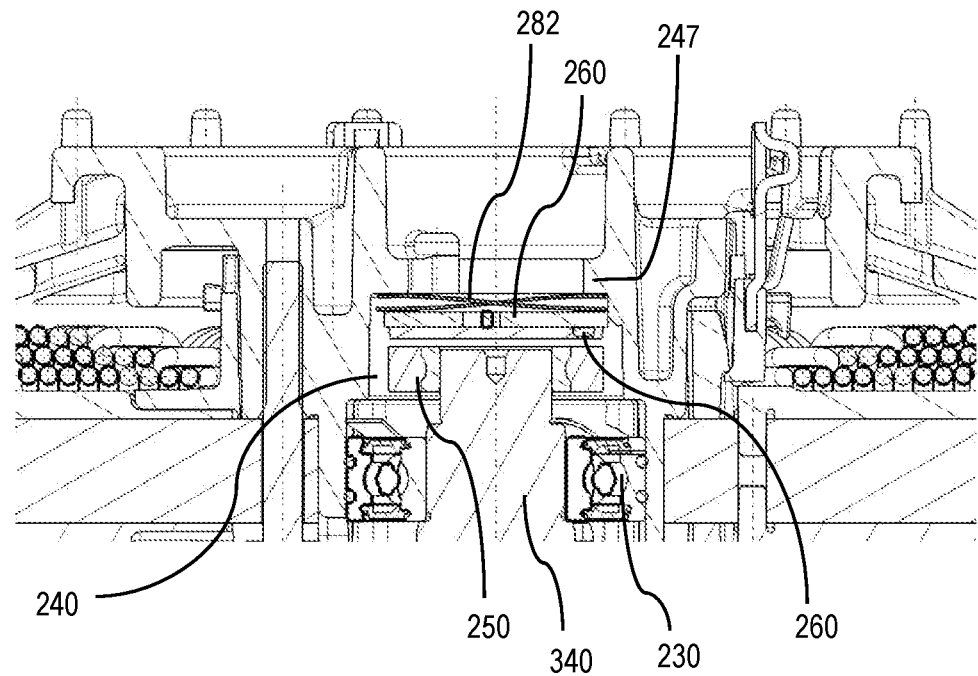
FIG. 8C depicts a partial cross-sectional view of the motor including a spring member behind the positional sensor board within the bearing pocket, according to an embodiment.

In an embodiment, the impact absorbing member may be a spring element 282 provided to absorb the impact on the positional sensor board 260, as depicted in the partial cross-sectional view of FIG. 8C. In an embodiment, spring member 282 may be a wave spring, though other types of spring such as a Belleville washer, disc spring, compression spring, torsion spring, etc. may alternatively be utilized. In an embodiment, spring member 282 is sized to be received within the sensor board pocket 248 and secured to the radial rim 247 or the side walls of the positional sensor board pocket 248 via, for example, adhesive, screws or other fastening mechanism. In an embodiment, positional sensor board 260 is in turn secured to the impact absorbing member 280 via, for example, an adhesive, screws, or other fastening mechanism. In an embodiment, spring member 282 may be provided with the sufficient thickness to effectively absorb the force of an impact upon the positional sensor board 260 by the rotor shaft 340 and/or the sense magnet ring 250, while maintaining proper airgap between the sense magnet ring 250 and the positional sensor board 260. In an embodiment, spring member 280 may have a thickness of 1-3 mm.

Figure 8D:
FIG. 8D depicts a wave spring used as the spring member of FIG. 8C, according to an embodiment.

FIG. 8D depicts a perspective view of a wave spring used as the spring member 282, according to an embodiment.

The first end cap 100 is described herein in detail with reference to FIGS. 9A-11B, and with continued reference to FIGS. 4A-5, according to an embodiment.

Figure 9A:
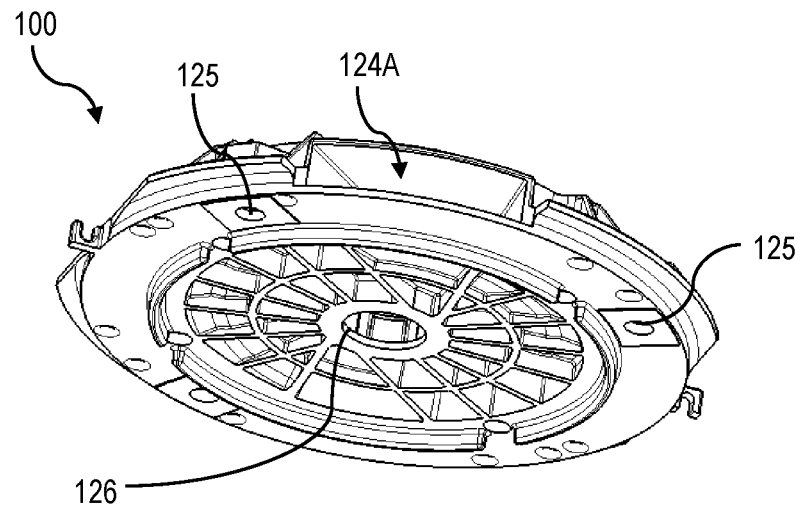
FIGS. 9A and 9B depict front and rear perspective views of the first end cap, according to an embodiment.
Figure 9B:
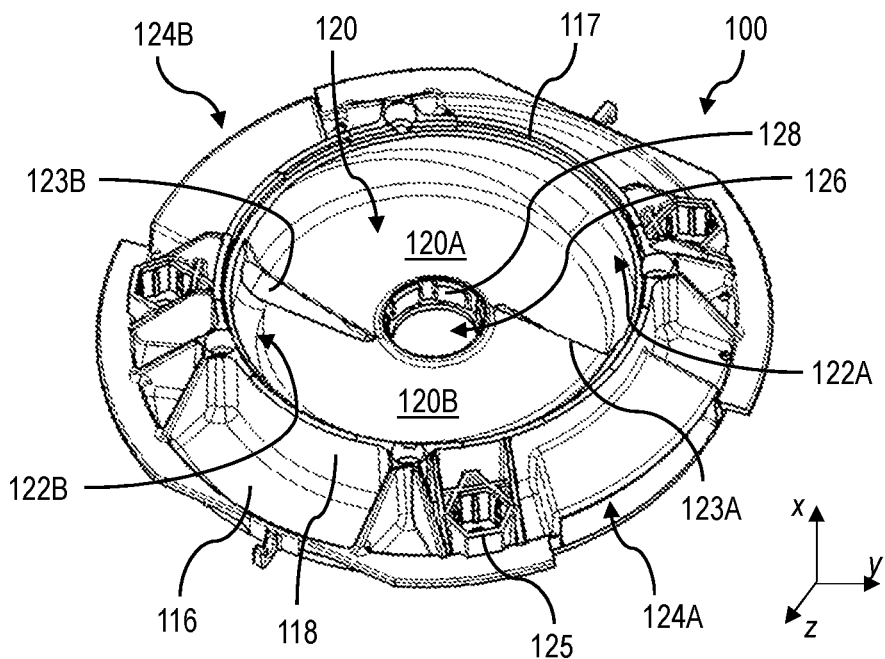

FIGS. 9A and 9B depict front and back perspective views of the first end cap 100, according to an embodiment. FIG.

Figure 11A:
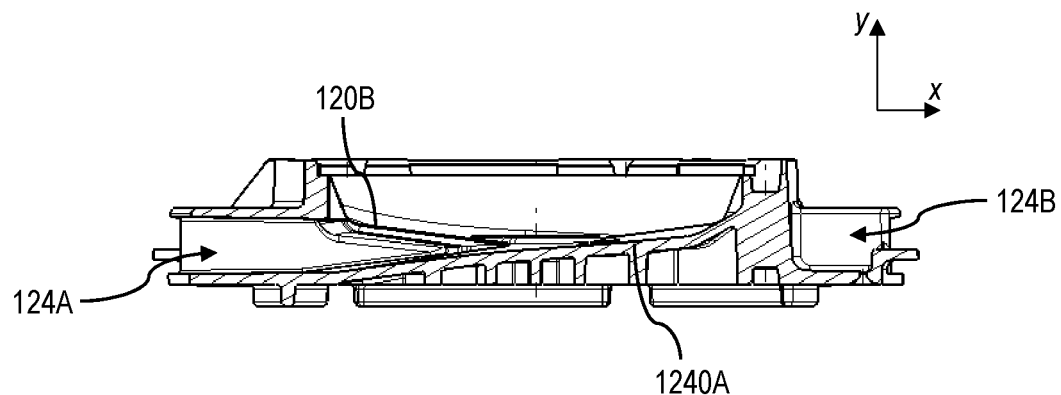
FIG. 11A depicts a side view of the first end cap, according to an embodiment.
Figure 11B:
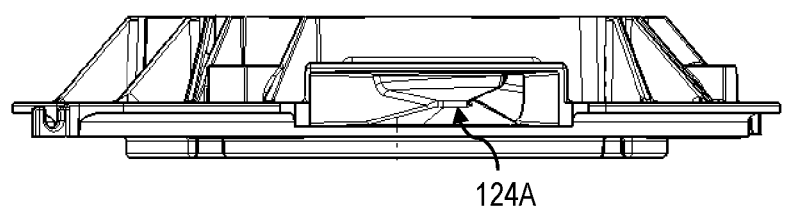
FIG. 11B depicts a side vertical cross-sectional view of the first end cap, according to an embodiment.

10A respectively depict a top perspective view and a top horizontal cross-sectional view of the first end cap 100 along the y-z plane, according to an embodiment. FIGS. 11A and 11B respectively depict a side perspective view and a side vertical cross-sectional view of the first end cap 100, according to an embodiment.

In an embodiment, as previously discussed, rotor shaft 340 passes through central opening 126 of the first end cap 100 to protrude into the main deck 52 of the electric mower 10 for driving the blades 14. Moreover, the central opening 126 includes a bearing pocket 128 sized to form-fittingly and securely receive the front bearing 130 of the rotor shaft 340. The front bearing 130 secures the rotor assembly 300 with respect to the first end cap 100 axially and radially, while allowing free rotation of the rotor assembly 300 within the first end cap 100.

Additionally, the first end cap 100 includes a radial back plate 120 facing the rotor assembly 300, an annular body 118 formed around the radial back plate 120, and a donut-shaped side plate 116 projecting outwardly around the annular body 118 along substantially the same plate as the radial back plate 120. A rear peripheral edge 117 of the annular body 118 comes to contact with front peripheral edge 208 of the second end cap 200 to substantially circumferentially enclose the rotor and stator assemblies 300 and 400.

Figure 10A:
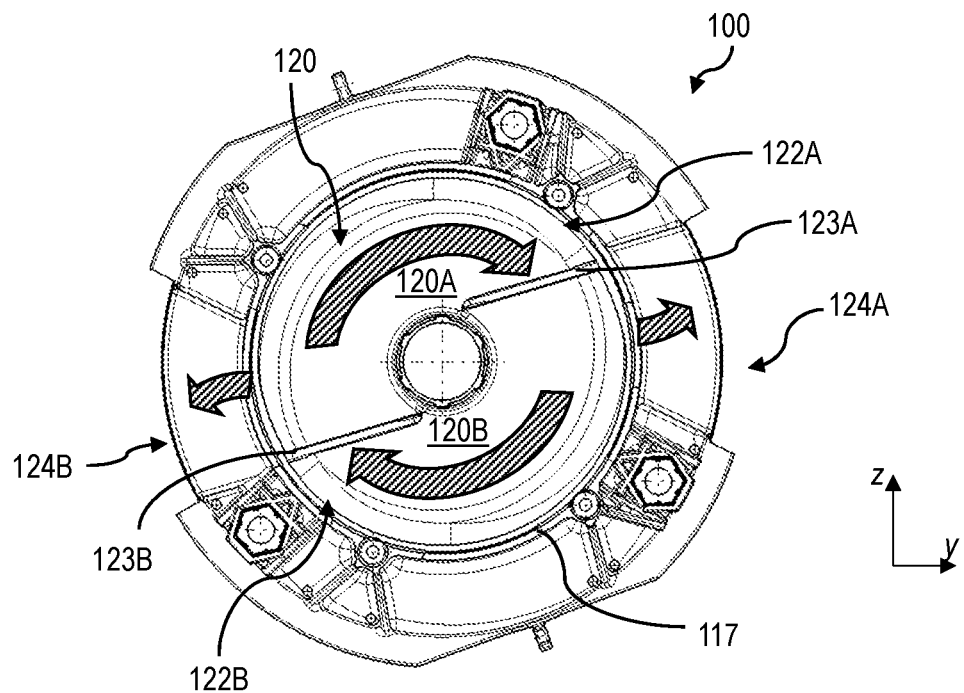
FIG. 10A depicts a top view of the first end cap, according to an embodiment.
Figure 10B:
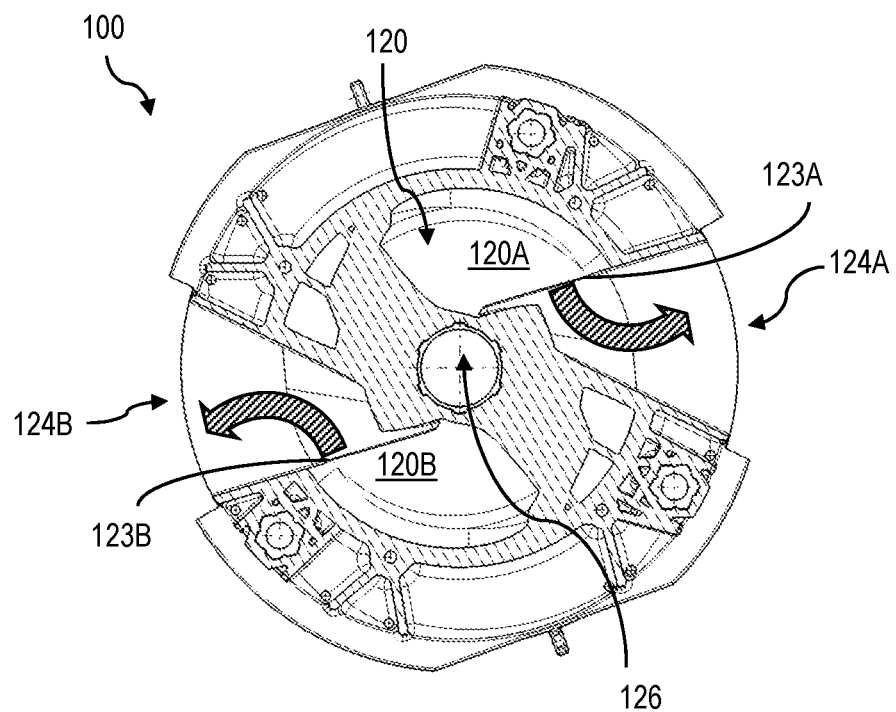
FIG. 10B depicts a top horizontal cross-sectional view of the first end cap, according to an embodiment.

In an embodiment, radial back plate 120 is disposed adjacent radial blades 326 that form the fan of the rotor assembly 300. The back plate 120 acts as a baffle for the fan, redirecting airflow generated by the fan to be expelled out of the exhaust ports 124A and 124B in a direction radial to the rotor shaft 340. In an embodiment, back plate 120 includes at least one sloped surface, for example, two sloped surfaces 120A and 120B, as shown in FIGS. 9B, 10B, and 11B. The two sloped surfaces 120A and 120B of the back plate 120 are each sloped with respect to a radial plane of the back plate 120 such that adjacent ends of the two slopes surfaces 120A and 120B are axially offset with respect to one another, forming two air gaps 123A and 123B therebetween. Each of the air gaps 123A and 123B extends from approximately the outer portion of the bearing pocket 128 to approximately an inner portion of the rear peripheral edge 117 of the annular body 118. The air gaps 123A and 123B are formed parallel to the x-y plane in FIG. 9B, where the x axis designates the longitudinal axis of the motor shaft 340. The air gaps 123A and 123B extend laterally into the annular body 118, forming air channels that are in fluid communication with the radial exhaust ports 124A and 124B. Radial exhaust ports 124A and 12B are formed over the side plate 116. As airflow generated by the fan comes into contact with the back plate 120, the sloped surfaces 120A and 120B cause centrifugal circulation of the airflow within the first end cap 100. Air gaps 123A and 123B intercept the centrifugal circulation path of the airflow within the first end cap 100, causing the air to exit the first end cap 100 in a radial and/or lateral direction through the exhaust ports 124A and 124B. Arrangement of the exhaust ports 124A and 124B above the main deck 52 of the electric mower 10 ensures that hot air existing the motor 500 does not enter the cavity 16 of the mower 10. The two sloped surfaces 120A and 120B of the back plate 120 can form baffles that can provide a cyclonic path for the airflow generated by the radial blades 326 to be directed towards the two radial exhaust ports 124A and 124B.

In an embodiment, each of the sloped surfaces 120A and 120B is an inclined surface, which has a starting end adjacent to the radial blades 326 of the rotor assembly 300 and a terminal end adjacent to the each of the corresponding exhaust ports 124A and 124B.

In an embodiment, each of the sloped surfaces 120A and 120B extend from the starting end to the terminating end along the circumferential direction with a substantially constant width from the starting end to the terminal end. Two connecting walls 122A and 1228 connect the outer edge of each of the sloped surfaces 120A and 1208 to the first end cap body. Each of the connecting walls 122A and 1228 can extend from the starting end of its corresponding sloped surfaces 120A and 1208 and to the terminating end of each of its corresponding sloped surfaces 120A and 1208.

In an embodiment, main deck 52 includes a corresponding through-hole that aligns with the central opening 126 for receiving the rotor shaft 340. In an embodiment, a series of screws are received through the cavity 16 of the main deck 52 through corresponding through-holes of the main deck 52 (not shown) and peripheral receptacles 125 of the first end cap 100. A series of slugs or threaded nuts 112 are provided on the side plate 116 of the first end cap 100 to securely receive the screws and fasten the first end cap 100 on top of the main deck 52. For this reason, the first end cap 100 is also referred to as the deck mount in this disclosure.

In an embodiment, the overall motor assembly 500 includes an envelope of approximately 140-180 mm, preferably approximately 150-170 mm, in an example approximately 160 mm, as defined by the diameter of the annular body 118 of the first end cap 110 and the diameter of the second end cap 200. Furthermore, the length of the more, as defined between the lower end of the first end cap 100 and the upper end of the second end cap 200, is approximately 60-100 mm, preferably approximately 70-90 mm, in an example approximately 80 mm. This approximately 2:1 ratio of the motor diameter to height provides for a high torque, high power, planar-shaped motor that can be flatly mounted on top of the main deck 52 of the mower 10.

Aspects of the stator assembly 400 are described herein in detail with reference to FIGS. 12A-14B, and with continued reference to FIGS. 4A-5, according to an embodiment.

Figure 12A:
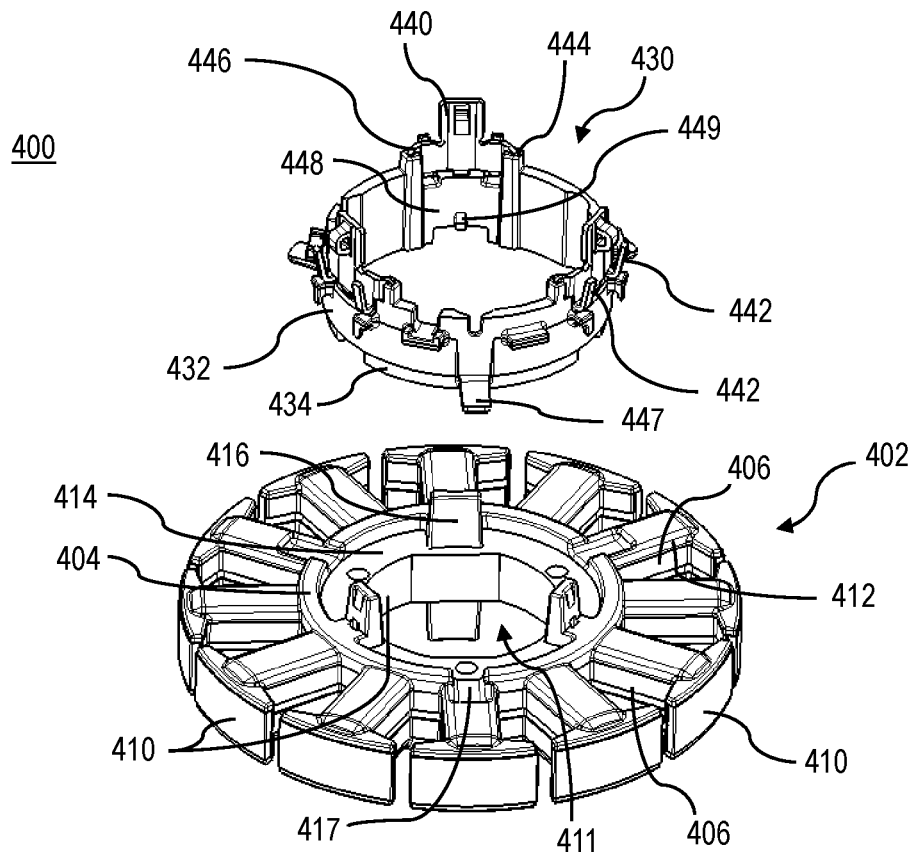
FIG. 12A depicts a perspective view of the stator assembly including a stator core and a stator collar prior to assembly, according to an embodiment.
Figure 12B:
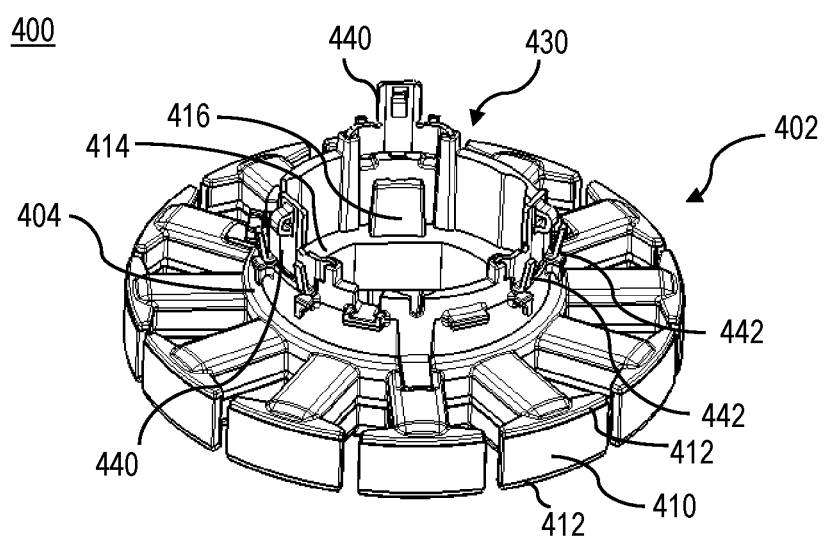
FIG. 12B depicts a perspective view of the stator assembly and the stator collar after assembly, according to an embodiment.
Figure 13A:
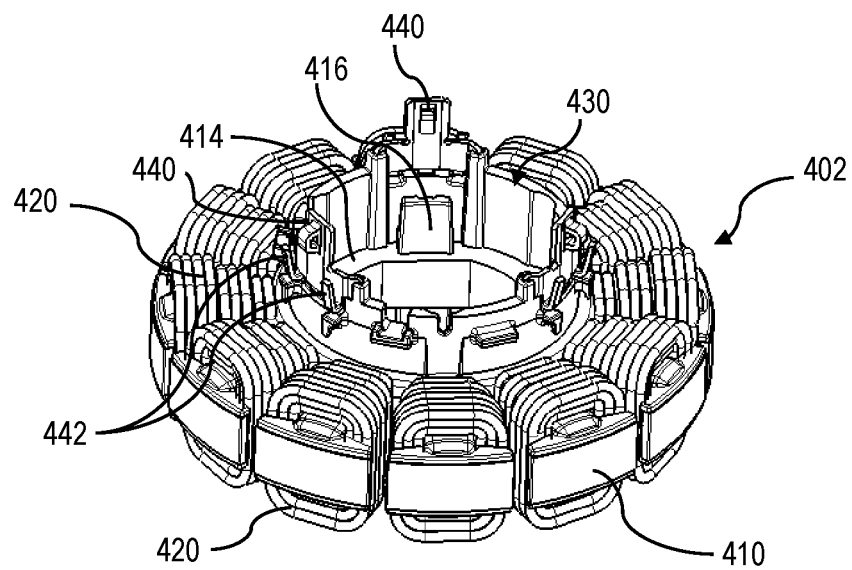
FIG. 13A depicts a perspective view of the stator assembly including stator windings and the stator collar mounted on the stator core, according to an embodiment.
Figure 13B:
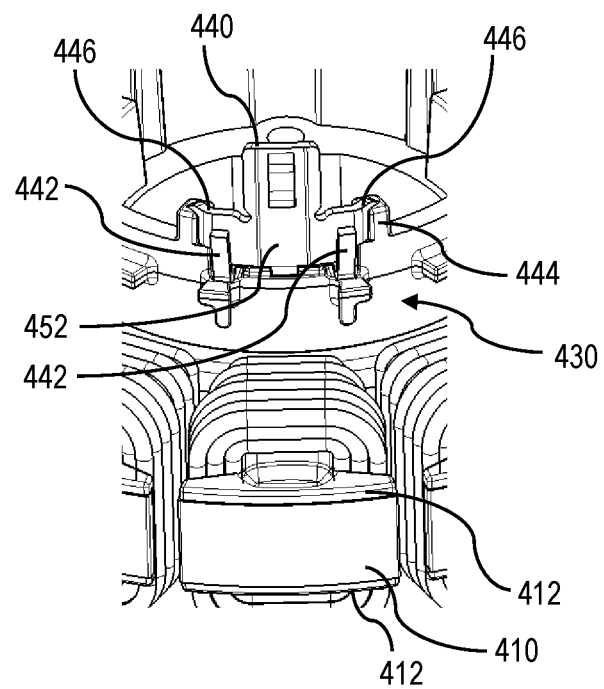
FIG. 13B depicts a partial zoomed-in perspective view of the stator assembly including the stator collar, according to an embodiment.
Figure 14A:
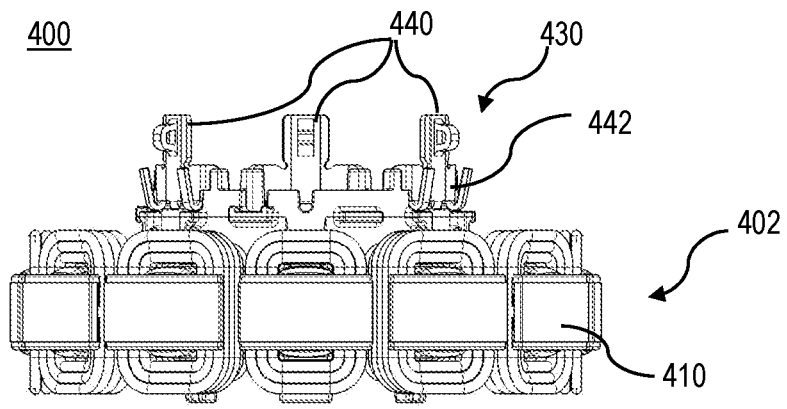
FIGS. 14A and 14B depict side and top views of the stator assembly, according to an embodiment.
Figure 14B:
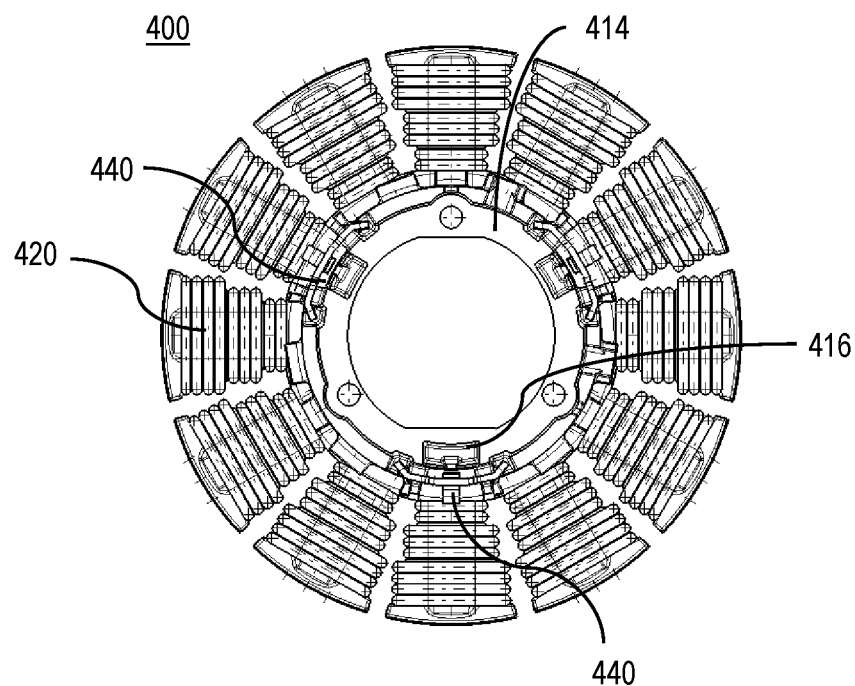

FIGS. 12A and 12B depict perspective views stator assembly 400 with a stator collar 430 prior and after assembly onto the ring-shaped stator core 402 of the stator assembly 400, according to an embodiment. FIG. 13A depicts a perspective view of the stator assembly 400 including the stator windings 420, with the stator collar 430 mounted thereon, according to an embodiment. FIG. 13B depicts a perspective zoomed-in view of the stator assembly 400 showing a single stator terminal 440 of the stator collar 430, according to an embodiment. Additionally, FIGS. 14A and 14B depict side and top views of the stator assembly 400, respectively, according to an embodiment.

In an embodiment, stator teeth 406 extend radially from the stator core 402. Each of the stator teeth 406 is wound by a stator coil to form the stator windings 420. The stator coils can be separately wound on the stator teeth 406 or continuous wound on the stator teeth 406, in a series or parallel and delta or wye configuration, as discussed above. In an embodiment, each of the stator teeth 406 is substantially T-shaped.

In order to electrically isolate the stator coils from the stator lamination stack 410, the end insulators 412 may be provided. In an embodiment, end insulators are discrete components mounted on the ends of the stator lamination stack 410, or at least partially encapsulate the stator lamination stack 410 by a process, such as an overmold process. The end insulators 412 can be made from a material such as plastic or resin.

In an embodiment, stator collar 430 can include a substantially-cylindrical insulation carrier 432, which may be formed from plastic material. Additionally, the stator collar 430 can include a series of stator terminals 440, such as three stator terminals 440, mounted on the insulation carrier 432 and electrically insulated from each other by the insulation carrier 432. In an embodiment, each of the stator terminals 440 can be pressed into the stator collar 430. In an embodiment, the stator collar 430 includes a series of side openings with railings or channels 444 arranged parallel to the center axis of the stator collar 430 (and center axis of the motor 500) along the side openings. The stator terminals 440 include two side guides 446 that are slidingly received within the railings or channels 444 to affix the stator terminals 440 within the side openings of the stator collar 430.

In an embodiment, at least one of the end insulators 412 of the stator assembly 400 includes an inner annular rim 404 that supports mounting the stator collar 430 on the stator assembly 300. The insulating carrier 432 of the stator collar 430 is annular and can be fixed to or be placed inside or on the inner annular rim 404 of the end insulator 412. In an embodiment, end insulator 412 includes a central opening formed within the annular rim 404 with a larger diameter than central opening 411 of the stator lamination stack 410. This arrangement exposes a donut-shaped mounting platform 414 of the end surface of the stator lamination stack 410 facing the stator collar 430. A lower portion 434 of the insulating carrier 432 includes an outer diameter that is smaller than the outer diameter of the insulating carrier 432, sized to fit within the annular rim 404 and rest on top of the mounting platform 414 of the end surface of the stator lamination stack 410.

In an embodiment, end insulator 412 can also be provided with a series of tabs 416 projecting axially (in parallel to the longitudinal axis of the motor 500) from or adjacent to the annular rim 404. Stator collar 430 similarly includes recessed surfaces 448 that removably receive the tabs 416 for positioning and retention of the stator collar 430 over the end insulator 412. In an embodiment, the tabs 416 or the recessed surfaces 448 may include snaps 449 for improved retention of the stator collar 430 over the end insulator 412.

In an embodiment, end insulator 412 further includes a series of recessed surfaces 417 that extend radially through the annular rim 404 into the outer surface of the teeth of the end insulator 412. Stator collar 430 is similarly provided with a series of radial protrusions 447 that are removably received within the recessed surfaces 417. The recessed surfaces 417 and radial protrusions 447 may be provided with snaps or other known retention features for securing the stator collar 430 over the end insulator 412.

In an embodiment, this configuration of the stator assembly 300 and stator collar 430 allows the stator collar 430 to be interchangeable with another one that has different types and/or quantities of stator terminals. The stator collar 430 may include different solder points for the terminals, different junctions for the terminals, different weld connections for the terminals, or a different number of terminals (e.g., for a 6-phase controlled motor v. a 3-phase controlled motor). Different stator collars 430 may be chosen by a motor designer based on, for example, the thickness of stator winding wires and/or the number of turns of windings around each stator tooth, the series or parallel connections between stator windings in the same phase, the delta or wye connections between stator windings of different phases, etc. For example, the dual-tang configuration described above may be more suited for a motor design with relatively thick stator windings. Interchangeability of the stator collar 430 allows a motor designer to adapt the same stator assembly 300 for different applications by only.

In an embodiment, stator collar 430 is provided with terminals 440 a main body 452 of which includes a curved contour when viewed in the axial direction of the motor 500 to form a uniform profile on the stator collar 430. In an embodiment, referring to FIG. 13B, each of the stator terminals 440 is a monolithic member, which includes at least two tangs 442 integrally extending radially-outwardly from the main body 452 of the stator terminal 440. This arrangement allows multiple sets of stator wires to be wound on the same terminal, increasing the capacity of each of the stator terminals 440. The two tangs 442 may be arranged at an angle from each other in the radial direction to simplify the fusing of the stator wires and aid in the winding of a coil. In this case, the stator terminals 440 may be arcuately shaped.

Figure 15:
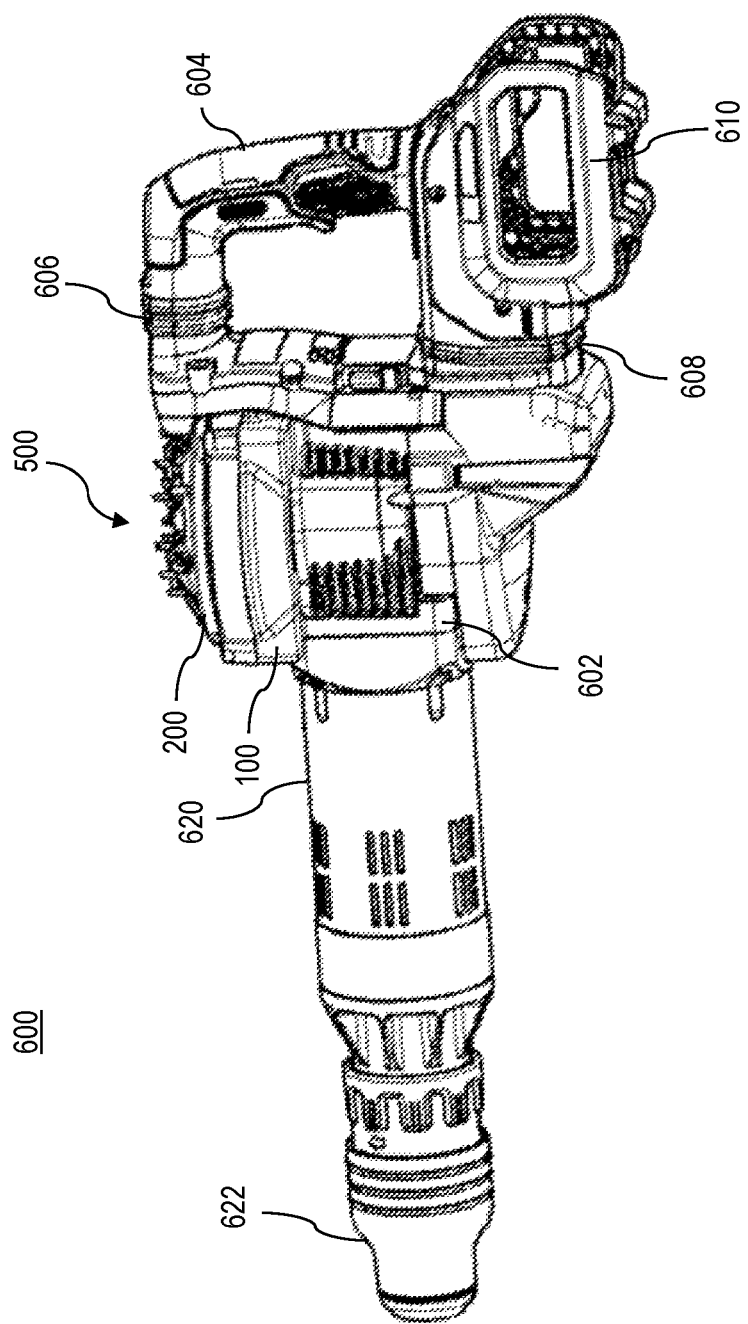
FIG. 15 depicts a perspective view of a cordless electric hammer having an outer-rotor brushless motor, according to an embodiment.
Figure 16:
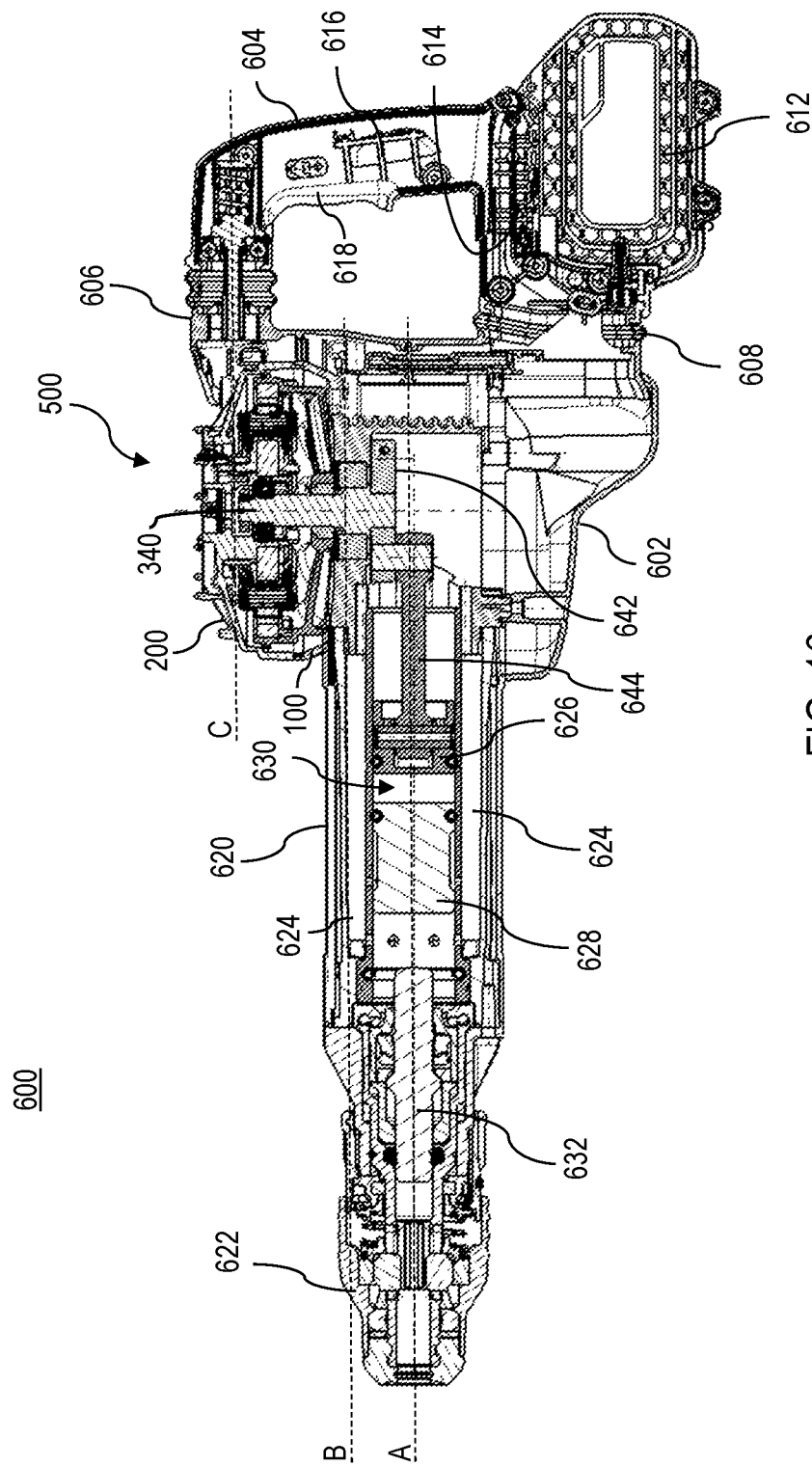
FIG. 16 depicts a side cross-sectional view of the hammer.
Figure 17:
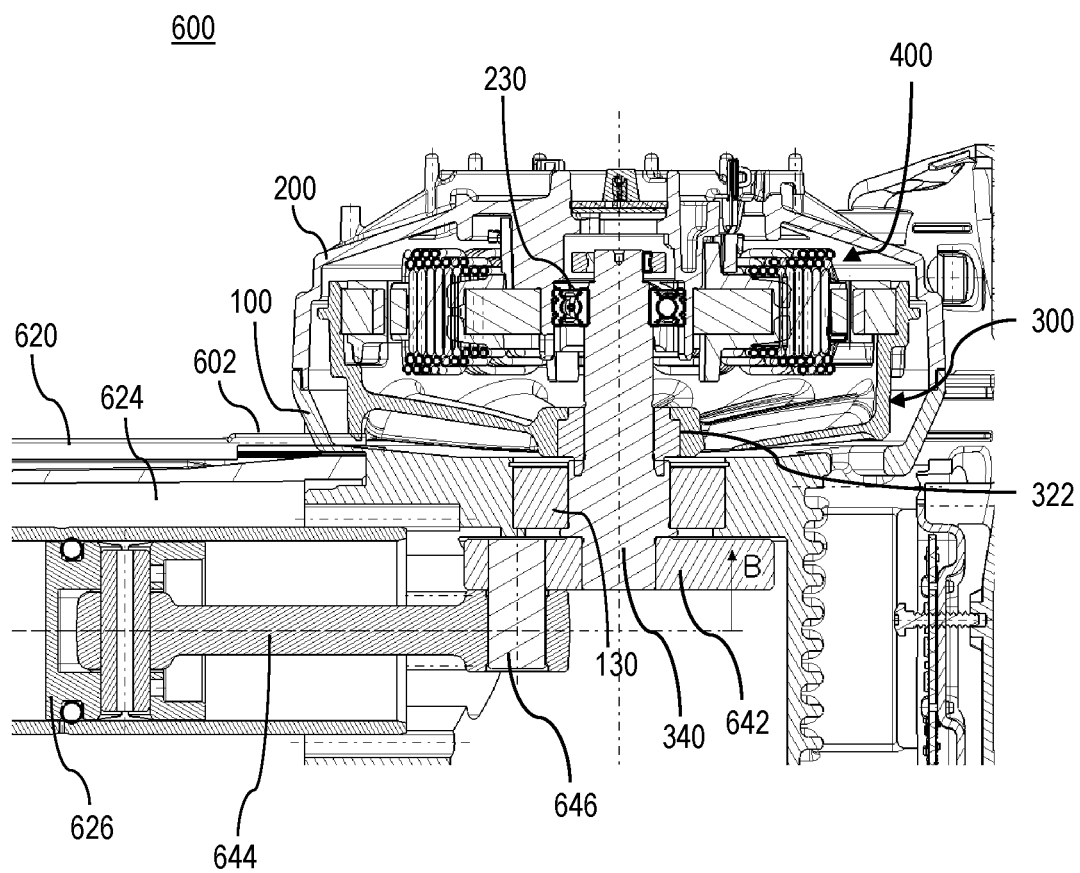
FIG. 17 depicts a partial zoom-in cross-sectional view of the hammer.

An alternative application of the outer-rotor BLDC motor 500 is described herein with reference to FIGS. 15-17, according to an embodiment.

FIG. 15 depicts a perspective view of a cordless electric hammer 600, according to an embodiment. FIG. 16 depicts a side cross-sectional view of the hammer 600.

Referring to these figures, hammer 600 comprises a main housing 602. In an embodiment, a handle 604 having two ends is attached to the main housing 602 via an upper mounting assembly 606 having vibration-absorbing features and a lower mounting assembly 608 having a pivoting member that allows slight pivoting of the handle 604 relative to the main housing 602. U.S. Pat. No. 10,137,562 titled "Rear Handle," which is incorporated herein by reference in its entirety, describes an example of the rear handle 604 and its mounting assemblies.

In an embodiment, a battery receptacle 610 is provided below the handle 604 rear of the lower mounting assembly 608. The battery receptacle 610 is configured to removably receive and lock in a power tool battery pack 612. Battery pack 612 may be, for example, a power tool 60V MAX battery pack configured to be slidingly received and secured within the battery receptacle 610. In an embodiment, the battery receptacle 610 includes a series of battery terminals 614 supported by the lower end of the handle 604 that engage and receive power from corresponding terminals of the battery pack 612.

In an embodiment, a control module 616 is further provided within the handle 604 for controlling the operation of the hammer 600. A trigger switch 618 may be supported by the handle 604 for engagement by a user forward of the control module 616. Control module 616 controls flow of power from the battery pack 612 based on an input from the trigger switch 618.

In an embodiment, hammer 600 further includes a cylindrical housing 620 disposed forward of the main housing 602. A tool holder 622 is provided forward of the cylindrical housing 620 for holding tools such as a chisel (not shown). Cylindrical housing 620 houses a tubular cylinder 624 and includes a pneumatic hammer mechanism for driving the chisel in a reciprocating motion. The pneumatic hammer mechanism includes a piston 626 located within tubular cylinder 624 and arranged for reciprocating motion, a ram 628 also arranged within the tubular cylinder 624 forward of the piston 626 for reciprocating motion, an air chamber 630 located within the tubular cylinder 624 between the piston 626 and the ram 628 to transfer reciprocating motion of the piston 626 to the ram 628, and a beat piece 632 located forward of the ram 628 for transferring the reciprocating motion of the ram 628 to a striking force on the chisel.

Details related to the hammer mechanism and its components can be found in, for example, U.S. Pat. No. 9,925,653 titled "Hammer Drill," and U.S. Pat. No. 7,331,407 titled "Vibration Reduction Apparatus for Power Tool and Power Tool Incorporating Such Apparatus," both of which are incorporated herein by reference in their entireties.

In an embodiment, a brushless outer-rotor motor 500, as described above with reference to FIGS. 3A through 14B, is mounted on the main housing 602 of the hammer 600. In an embodiment, first end cap 100 of the motor 500 is mounted on the main housing 602 such that the motor 500 components are positioned substantially outside an extension envelope defined by the cylindrical housing 620. In an embodiment, motor 500 is fully positioned above a horizontal plane formed by longitudinal axis 'A' of the hammer 500, whereas battery receptacle 610 is fully positioned below the same plane. In an embodiment, a portion of the first end cap 100 intersects a longitudinal axis 'B' of the upper wall of cylindrical housing 620 and/or an upper wall of the tubular cylinder 624. In an embodiment, a portion of the second end cap 200 intersects a longitudinal axis 'C' of the upper mounting assembly 606 of the rear handle 616. In an embodiment, the upper end of the main body 602 near the upper mounting assembly 606 is secured to the second end cap 200 for added structural support of the motor 500 relative to the hammer 600.

Figure 18:
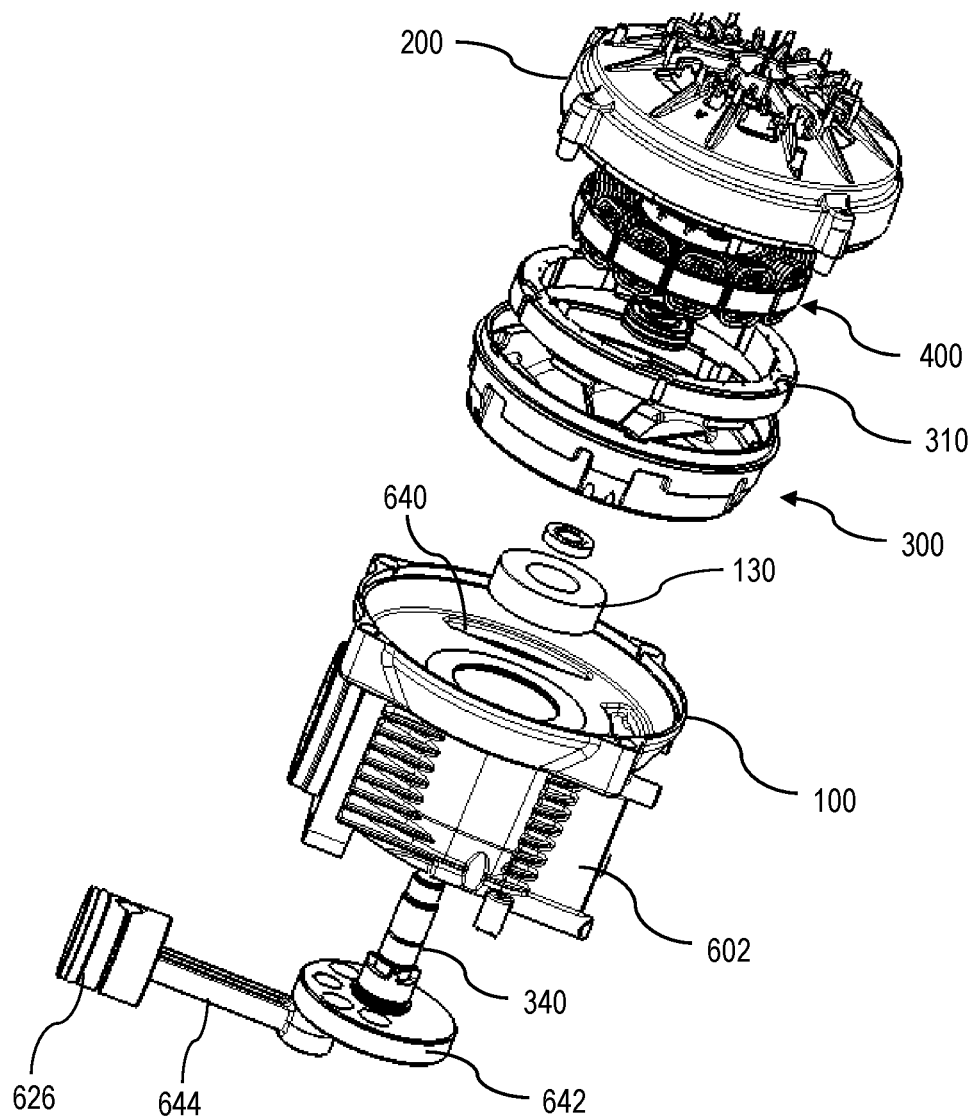
FIG. 18 depicts a partial exploded view of the motor relative to the main housing.

FIG. 17 depicts a partial zoom-in view of the hammer 600. FIG. 18 depicts a partial exploded view of the motor 500 relative to the main housing 602. As shown here, and with continued reference to FIGS. 15 and 16, in an embodiment, motor 500 includes the same stator 400, rotor 300, first end cap 100, and second end cap 200 as described above, with first end cap 100 shaped to be suitably mounted on top of the main housing 602 or disposed within a cavity provided on the main housing 602.

In an embodiment, rotor shaft 340 extends perpendicularly to the longitudinal axis 'A' of the hammer 600 from the motor 500 and through the main housing 602. Rotor shaft 340 is supported relative to the stator assembly 400 via rear bearing 230, as described above in detail. In an embodiment, rear bearing 230 is fully located outside the main housing 602 as well as the extension envelope defined by the cylindrical housing 620. Rotor shaft 340 is further supported relative to the first end cap 100 via front bearing 130. In an embodiment, front bearing 130 intersects the longitudinal axis 'B' of the upper wall of cylindrical housing 620 and/or an upper wall of the tubular cylinder 624.

In an embodiment, a lower end of the rotor shaft 340 is coupled to a crank wheel 642 within the main housing 602. The crank wheel 642 is caused to rotate about the axis of the rotor shaft 340 by rotation of the rotor shaft 340. In an embodiment, a piston arm 644 extends rearwardly from the piston 626 and penetrates into the main housing 602. The crank wheel 642 is coupled to end of the piston arm 644 via a pivoting pin 646. Rotary motion of the crank wheel 642 is transferred to a reciprocating motion of the piston arm 644 via the pivoting pin 646.

In an embodiment, crank wheel 642 may mounted on the rotor shaft 340 by, for example, press-fitting or alternative mounting means. Direct mounting of the crank wheel 642 on the rotor shaft 340 provides for a direct-drive mechanism without any reduction gears, which reduces heat loss and increases efficiency. Electronic commutation of the motor 500 by control unit 616 allows for optimization of motor speed and power output as required without a need for gear reduction system. In an embodiment, motor 500 may be controlled to output a maximum power of 1300 W to 1700 W, preferably approximately 1500 W, at a rotational speed of 2000 to 3000 RPM, suitable for direct drive of the hammer 600. Alternatively, the crank wheel 642 may include gears that mesh with corresponding gears on the rotor shaft 340.

In an embodiment, 60V Max battery packs having capacity rating of 3 Ah to 12 Ah may be utilized to power the hammer 600. These battery packs may have a weight range of 2.5 to 4.5 lbs. One advantage of disposition of the motor 500 above the main housing 602 and opposite the battery receptable 610, as described above, is more efficient balancing of the hammer 600. In an embodiment, the above-described configuration ensures that the hammer 600, when provided with a 60V Max battery pack, has a center of gravity that is significantly close to the central longitudinal axis 'A' of the hammer 600. In an embodiment, a distance between said center of gravity and the longitudinal axis 'A' of the hammer 600 is less than approximately 20%, more preferably less than approximately 10%, of the full height of the hammer 600 as measured from the top of the handle 604 to the bottom of the battery pack 612.

In an embodiment, as discussed above, the first end cap 100 may be mounted over the main housing 602. The first end cap 100 may be secured to the main housing 602 by any known mean such as screws. Alternatively, as shown in FIG. 18, the first end cap 100 may be formed integrally as part of the main housing 602 as a single piece.

In an embodiment, first end cap 100 may be provided with radial exhaust ports as previously described in order to substantially isolate the airflow through the motor 500 from the main housing 602. In an embodiment, while some leakage of air from the first end cap 100 to the main housing 602 is possible, the air is substantially prevented from entering the main housing 602. In this embodiment, an additional fan (not shown) may be provided on the motor shaft 340 above the crank wheel 642 to cool the internal components of the hammer 600. Alternatively, as shown in FIG. 18, the first end caps 100 may be provided with a series of air vents 640 that allow flow of air from the motor 500 into the main housing 602 in a direction along the axis of the rotor shaft 340 for cooling of the internal components of the hammer 600.

Another aspect of the invention is described herein with reference to FIGS. 19-25.

In many power tools, including certain demolition hammers, the low speed and high torque requirements of the tool, a gear system may be required to reduce the speed of the motor to a suitable level. Existing gear trains and motor configurations for such tools typically include multiple levels of reductions that significantly increase the tool size. For example, existing concrete breakers in the 10 kg to 1 kg range either use AC motors or smaller BLDC motors with high gear reductions to meet the pneumatic mechanism requirements. These motors run at speeds of greater than 15,000 rpm, requiring gear reductions of more than 10:1.

In an embodiment, using the outer-rotor motor described above, a gear train reduction of 6:1 or less may be utilized to meet the output speed and torque requirements of a demolitions hammer. In an embodiment, the gear system may be incorporated into the hammer in a compact and efficient manner that does not add to the overall length and width of the power tool and only slightly increases the height of the hammer along a direction perpendicular to the longitudinal axis 'A' of the hammer.

Figure 19:
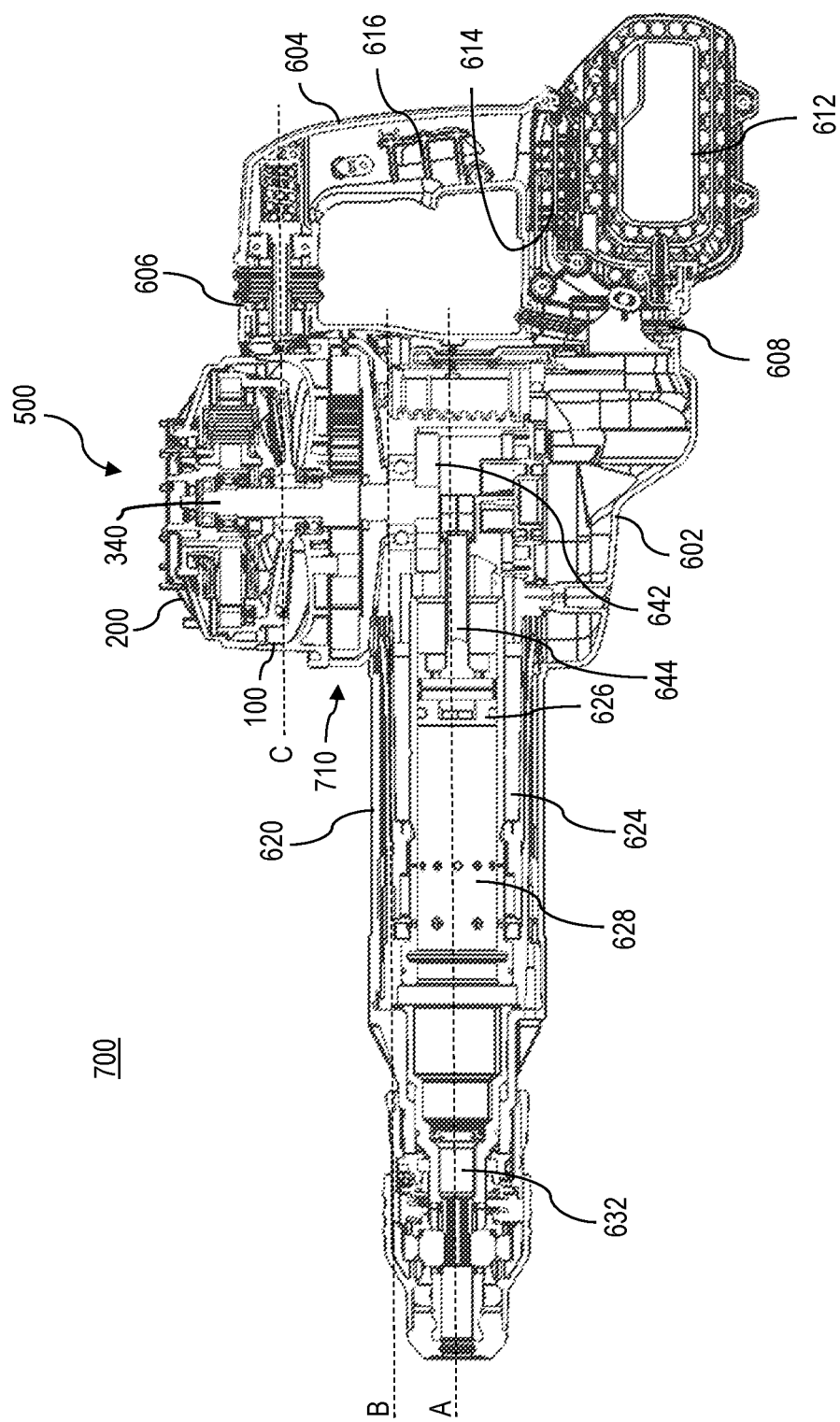
FIG. 19 depicts a side cross-sectional view of a hammer having a gear system, according to an alternative embodiment.

FIG. 19 depicts a side cross-sectional view of a hammer 700 having a gear assembly 710, according to an embodiment. Hammer 700 is similar in many aspects to hammer 600 described above, and to the extent that the components are similar, the same reference numerals are shown in this figure. In an embodiment, a brushless outer-rotor motor 500, as described above with reference to FIGS. 3A through 14B, is mounted on the main housing 602 of the hammer 700. Additionally, in an embodiment, the gear assembly 710 is disposed between the motor 500 and the main housing 602 of the hammer 700. Gear assembly 710 is positioned substantially outside the extension envelope defined by the cylindrical housing 620.

Figure 20:
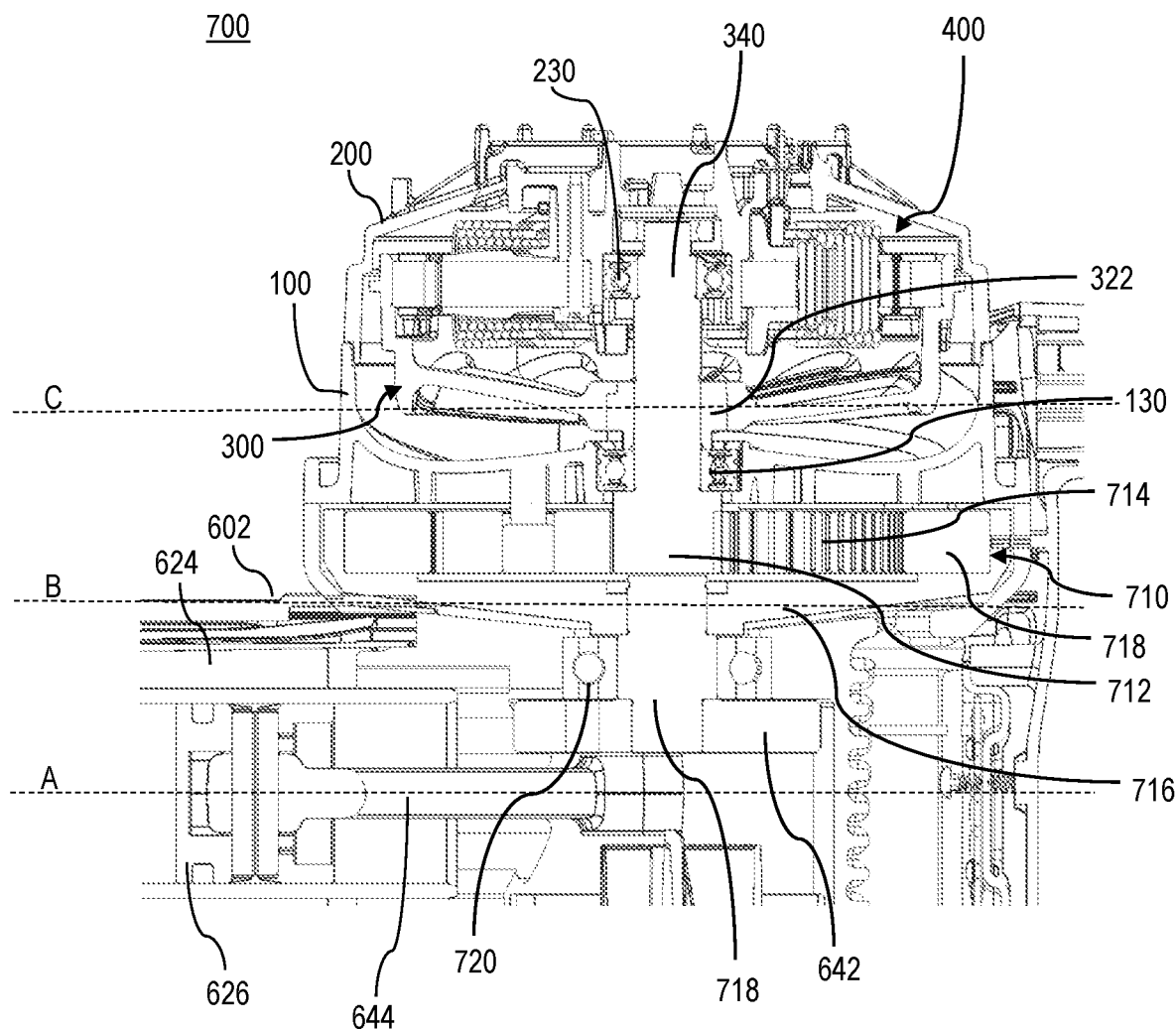
FIG. 20 depicts a partial exploded view of the motor and gear assembly relative to the main housing 60, according to an embodiment.
Figure 21:
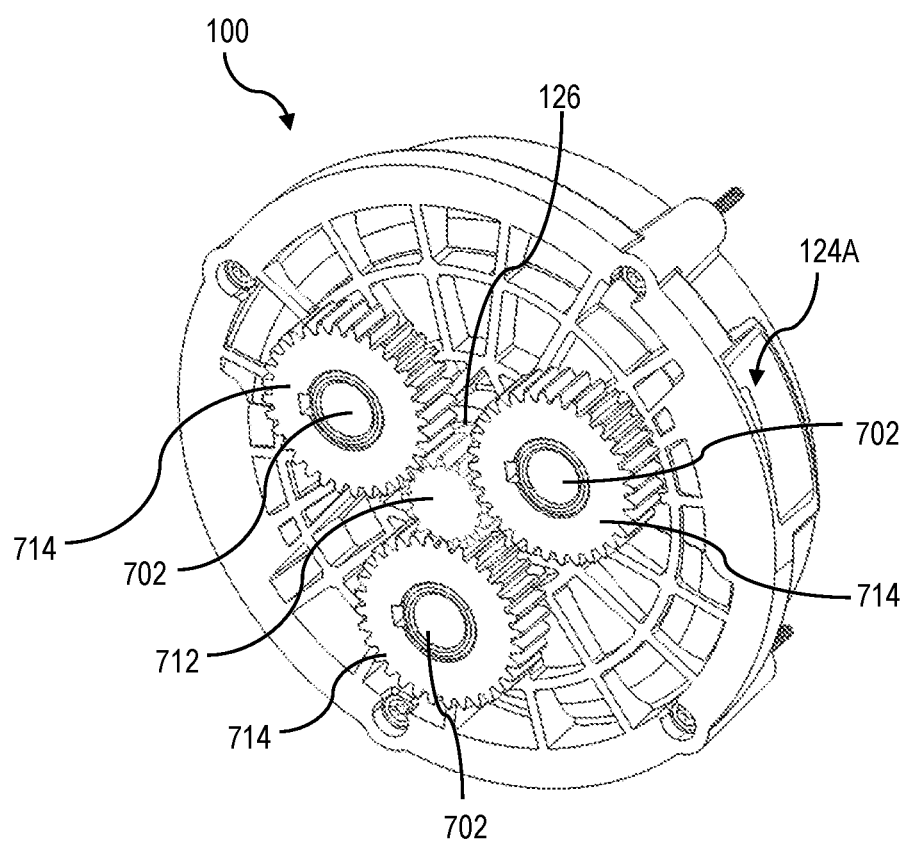
FIG. 21 depicts a rear perspective view of the first end cap for mounting the gear assembly, according to an embodiment.
Figure 22:
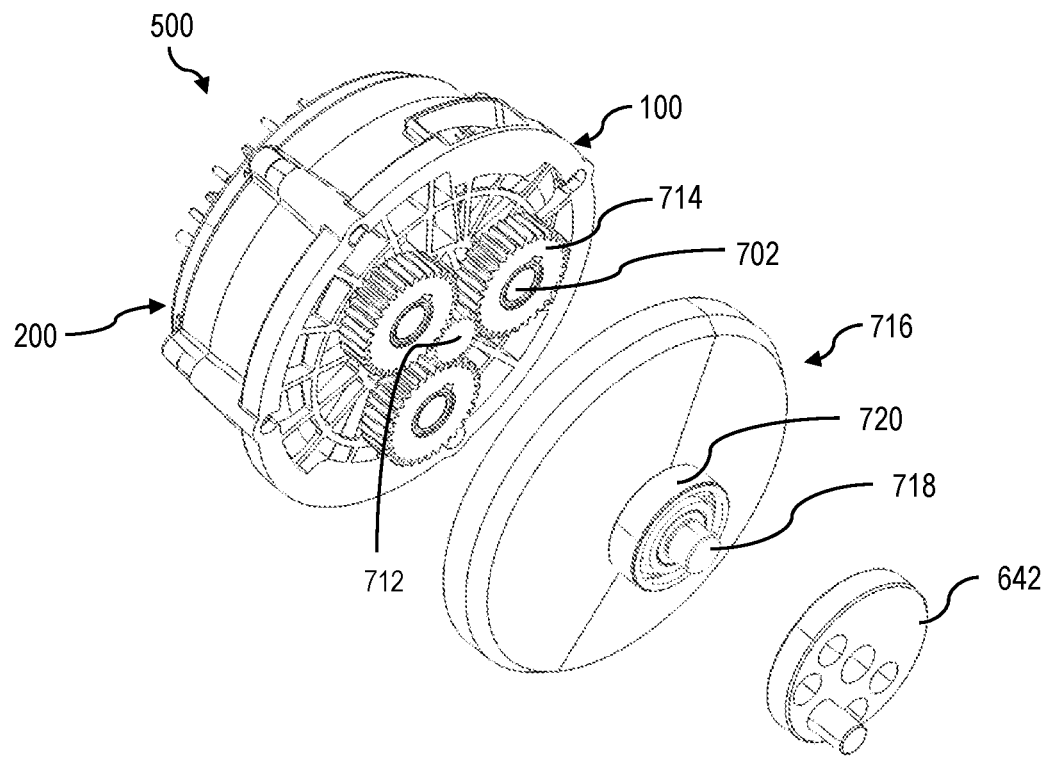
FIGS. 22 and 23 depict two exploded perspective views of the gear assembly relative to the motor, according to an embodiment.
Figure 23:
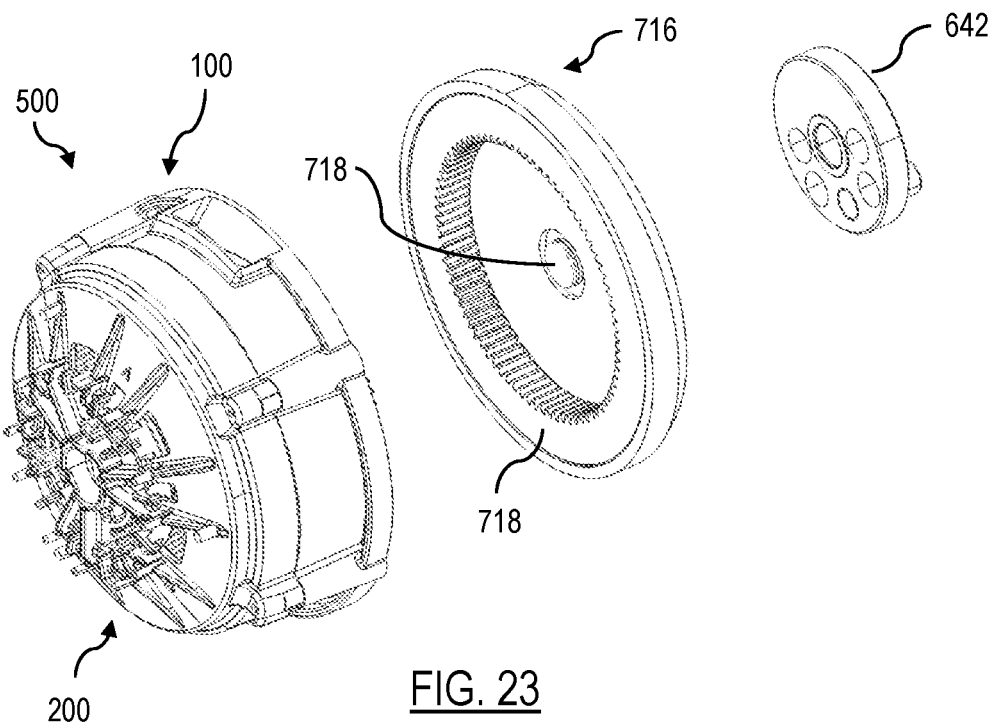
Figure 24:
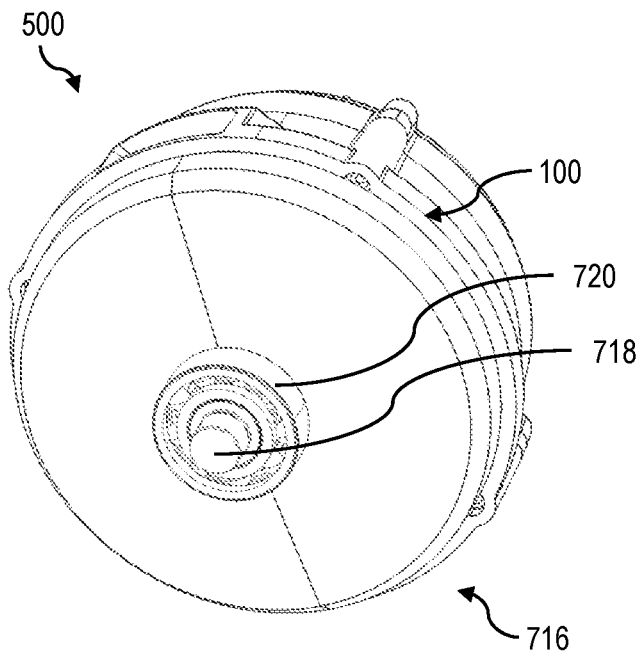
FIG. 24 depicts a perspective view of the gear assembly mounted on the motor, according to an embodiment.
Figure 25:
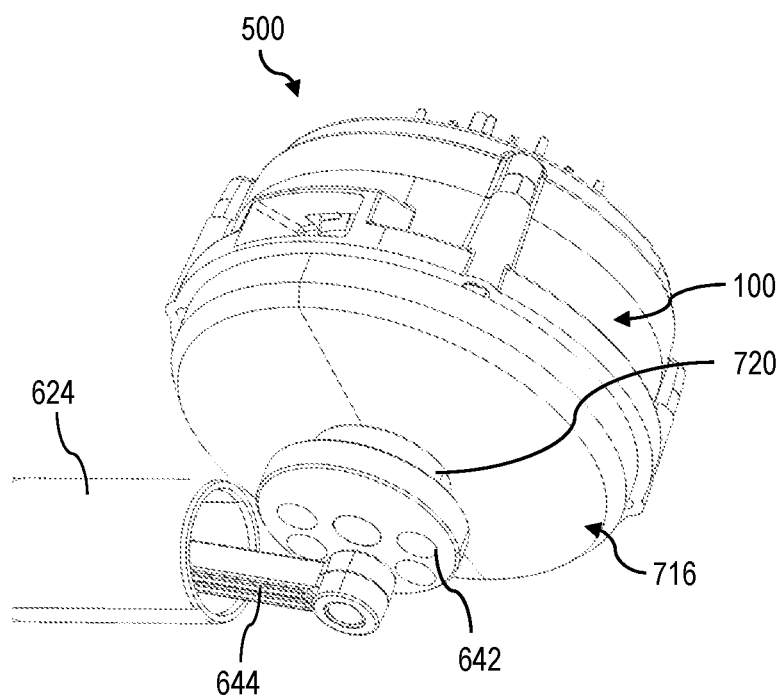
FIG. 25 depicts a perspective view of the crank wheel mounted on the gear assembly and the motor, according to an embodiment.

FIG. 20 depicts a partial exploded view of the motor 500 and gear assembly 710 relative to the main housing 602. FIG. 21 depicts a rear perspective view of the first end cap 100 for mounting the gear assembly 710, according to an embodiment. FIGS. 22 and 23 depict two exploded perspective views of the gear assembly 710 relative to the motor 500, according to an embodiment. FIG. 23 depicts a perspective view of the gear assembly 710 mounted on the motor 500. FIG. 24 depicts a perspective view of the crank wheel 642 mounted on the gear assembly 710 and the motor 500, according to an embodiment.

In an embodiment, as shown in FIGS. 20 and 21, a sun gear 712 is provided on the end of the rotor shaft 340 that projects through the center opening 126 of the first end cap 100 of the motor 500. The first end cap 100 is provided with a series of three rearwardly-projecting pins 702 provided equidistantly around the center opening 126. A series of three planetary gears 714 are disposed around the pins 712 in engagement with the sun gear 712.

In an embodiment, as shown in FIGS. 20 and 22-25, a flywheel 716 is mounted below the motor 500 in contact with the lower surface of the first end cap 100. The flywheel 716 includes a main body 717 that is securely mounted on a drive shaft 718 via, e.g., press-fitting. The main body 717 further holds a ring gear 715 in engagement with the planetary gears 714. This arrangement causes the rotation of the flywheel 716 with the rotor shaft 340 at a reduced speed. In an embodiment, a transmission bearing 720 is mounted on the drive shaft 718 to support the flywheel 716 relative to the main housing 602.

In an embodiment, referring to FIGS. 19 and 20, gear assembly 710 is substantially positioned between the longitudinal axis 'B' of the upper wall of cylindrical housing 620 and/or an upper wall of the tubular cylinder 624, and the longitudinal axis 'C' of the upper mounting assembly 606 of the rear handle 616. Specifically, in an embodiment, transmission bearing 720 is located within the envelope of the cylindrical housing 620, but the gears 712, 714 and 715 are located outside the envelope of the cylindrical housing 620. In this embodiment, the longitudinal axis 'C' of the upper mounting assembly 606 of the rear handle 616 intersects a portion of the first end cap 100. In an embodiment, the diameter of the ring gear 715 is substantially equal to the diameter of the motor 500.

In an embodiment, the gear assembly 710 provides a gear ratio of 5:1 in a single stage without significantly adding to the overall height of the hammer 700. The large diameter and short overall length of the motor 500 lends itself to use of the gear assembly 710 as described. In an embodiment, the overall height of the hammer 700 including the gear assembly 710 is therefore approximately 10% to 14% greater than the overall height of the hammer 600 with direct-drive, without any considerable changes to the length and/or width of the hammer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a housing;
   a brushless direct-current (BLDC) motor comprising:
   a stator having a stator core, a plurality of teeth extending radially outwardly from the stator core, and a plurality of windings wound around the stator teeth;
   a rotor shaft extending along a center axis and including a first bearing and a second bearing;
   a rotor having a rotor core disposed around the stator, a plurality of permanent magnets secured to the rotor core, an inner annular member mounted on the rotor shaft;
   a first end cap secured to the housing configured to support the first bearing, the first end cap including a radial back plate having a center opening in the radial back plate through which the rotor shaft extends and a plurality of pins projecting around the rotor shaft and parallel to the rotor shaft; and
   a second end cap configured to support the second bearing;
   a gear assembly mounted on the first end cap and including a plurality of planetary gears supported by the plurality of pins in engagement with the rotor shaft;
   a ring gear that engages the plurality of planetary gears to transfer a rotational of the rotor shaft to the ring gear and cause the rotation of the ring gear at a reduced speed compared to a rotational speed of the rotor shaft; and
   an output member rotationally coupled with the ring gear.

2. The power tool of claim 1, wherein the output member comprises a flywheel fixedly mounted on the ring gear.

3. The power tool of claim 2, wherein a diameter of the flywheel is approximately equal to a diameter of the first end cap.

4. The power tool of claim 2, wherein a diameter of the ring gear is approximately equal to a diameter of the first end cap.

5. The power tool of claim 2, wherein the gear assembly further comprises a drive shaft coaxially projecting from the flywheel to rotate with the flywheel.

6. The power tool of claim 5, further comprising a transmission bearing mounted on the drive shaft to support the flywheel relative to the housing.

7. The power tool of claim 1, wherein the first end cap is mounted on the housing and the second end cap is disposed outside the housing.

8. The power tool of claim 7, wherein the first end cap is integrally formed with the housing.

9. The power tool of claim 1, wherein the power tool further comprises:
   a tubular cylinder housed within the housing defining a longitudinal axis;
   a piston reciprocatingly disposed within the tubular cylinder;
   a crank mechanism disposed within the housing configured to convert a rotary motion to a reciprocating motion for driving the piston;
   a tool holder mounted on the housing forward of the tubular cylinder; and
   a battery receptacle provided on the housing for receiving a removable power tool battery pack, the battery pack being provided on a first side of a plane that intersects the longitudinal axis when received within the battery receptacle,
   wherein the motor is mounted on the housing on a second side of the plane that intersects the longitudinal axis such that a distance between the longitudinal axis and a center of gravity of the power tool with the battery pack received within the battery receptacle is less than or equal to approximately 20% of a full height of the power tool.

10. A power tool comprising:
    a housing;
    a tubular cylinder housed within the housing defining a longitudinal axis;
    a piston reciprocatingly disposed within the tubular cylinder;
    a crank mechanism disposed within the housing configured to convert a rotary motion to a reciprocating motion for driving the piston;
    a handle having two ends mounted to the housing;
    a battery receptacle disposed adjacent a first end of the handle;
    a brushless direct-current (BLDC) motor mounted within or on the housing, the motor comprising:
    a stator having a stator core, a plurality of teeth extending radially outwardly from the stator core, and a plurality of windings wound around the stator teeth;
    a rotor shaft extending along a center axis and including a first bearing and a second bearing;
    a rotor having a rotor core disposed around the stator, a plurality of permanent magnets secured to the rotor core, an inner annular member mounted on the rotor shaft;
    a first end cap secured to the housing configured to support the first bearing, the first end cap including a radial back plate having a center opening in the radial back plate through which the rotor shaft extends; and
    a second end cap configured to support the second bearing; and
    a gear assembly disposed between the first end cap of the motor and the crank mechanism and engaging the rotor shaft to reduce an output speed of the motor,
    wherein the motor and the gear mechanism are mounted on the housing outside a cylindrical envelope defined by the tubular cylinder, and the motor is disposed adjacent a second end of the handle.

11. The power tool of claim 10, wherein a longitudinal axis of the second end of the handle intersects the first end cap.

12. The power tool of claim 10, wherein the gear assembly further comprises a flywheel including a ring gear that engages the plurality of planetary gears.

13. The power tool of claim 12, wherein the flywheel intersects a longitudinal axis of an upper wall of the tubular cylinder.

14. The power tool of claim 12, wherein the gear assembly further comprises a drive shaft coaxially projecting from the flywheel to rotate with the flywheel, the drive shaft being coupled to the crank mechanism.

15. The power tool of claim 14, further comprising a transmission bearing mounted on the drive shaft to support the flywheel relative to the housing.

16. The power tool of claim 10, wherein the gear assembly provides a gear reduction of less than or equal to 6:1.

* * * * *